US011798053B2

(12) United States Patent
Henmi et al.

(10) Patent No.: US 11,798,053 B2
(45) Date of Patent: Oct. 24, 2023

(54) INFORMATION PROVISION SYSTEM, INFORMATION PROVISION METHOD, AND STORAGE MEDIUM

(71) Applicant: Universal Entertainment Corporation, Tokyo (JP)

(72) Inventors: Takuo Henmi, Tokyo (JP); Shigefumi Iinuma, Tokyo (JP); Takaaki Okade, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 294 days.

(21) Appl. No.: 16/909,281

(22) Filed: Jun. 23, 2020

(65) Prior Publication Data

US 2020/0320604 A1 Oct. 8, 2020

Related U.S. Application Data

(63) Continuation of application No. 15/268,163, filed on Sep. 16, 2016, now abandoned.

(30) Foreign Application Priority Data

Sep. 25, 2015 (JP) ................................ 2015-188769

(51) Int. Cl.
*G06Q 30/0601* (2023.01)
*G06Q 30/016* (2023.01)
*G06F 16/9535* (2019.01)

(52) U.S. Cl.
CPC ..... *G06Q 30/0625* (2013.01); *G06F 16/9535* (2019.01); *G06Q 30/016* (2013.01); *G06Q 30/0631* (2013.01)

(58) Field of Classification Search
CPC ...................... G06Q 30/0625; G06Q 30/0631
See application file for complete search history.

(56) References Cited

U.S. PATENT DOCUMENTS 7,194,546 B2 * 3/2007 Kameoka ............ G06F 16/9535
709/229
2011/0060664 A1 3/2011 Bezos et al.
(Continued)

OTHER PUBLICATIONS

Understanding the mobile user's purchase-decision involvement. Hooper, Mark A; Sant, Paul. International Journal of Digital Information and Wireless Communications5.3: 165(14). The Society of Digital Information and Wireless Communications. (Jul. 2015) (Year: 2015).*

(Continued)

*Primary Examiner* — Michael Misiaszek
(74) *Attorney, Agent, or Firm* — United IP Counselors, LLC; Kenneth M. Fagin

(57) ABSTRACT

Provided is an information provision system which determines preference of a user based on a dialogue with the user utilizing an Internet shopping site and determines a recommended commodity based on the determined preference. An information provision server in an information provision system receives utterance (input) by a user utilizing an Internet shopping site via a user terminal and provides a response thereto onto the user terminal, thereby performing control so as to have a conversation with the user. Further, based on the input by the user and user attributes, the information provision server determines a user type of the user and when a recommended commodity is presented to the user, determines the recommended commodity from among commodities purchased by other user whose user type is the same as the user type of the user.

12 Claims, 38 Drawing Sheets

(56) References Cited

U.S. PATENT DOCUMENTS

| | | |
|---|---|---|
| 2012/0072310 A1 | 3/2012 | Ballas |
| 2012/0158516 A1* | 6/2012 | Wooten, III ....... G06Q 30/0269 |
| | | 705/14.66 |
| 2013/0268468 A1* | 10/2013 | Vijayaraghavan ..... G06N 20/00 |
| | | 706/12 |
| 2013/0339163 A1* | 12/2013 | Dumontet .......... G06Q 30/0631 |
| | | 705/15 |
| 2014/0279250 A1* | 9/2014 | Williams ........... G06Q 30/0257 |
| | | 705/26.62 |
| 2015/0081469 A1* | 3/2015 | Acharyya .......... G06Q 30/0631 |
| | | 705/26.7 |
| 2015/0178371 A1* | 6/2015 | Seth .................... G06Q 30/016 |
| | | 707/755 |

OTHER PUBLICATIONS

References Are Not Being Filed Herewith. They Are Already of Record in One or More of the Following Applications, Which Are Being Relied On for Priority Under 35 U.S.C. Section 120 (see 37 C.F.R. Section 1.98(d)(1)): U.S. Appl. No. 15/268,163, filed Sep. 16, 2016.

* cited by examiner

FIG. 7
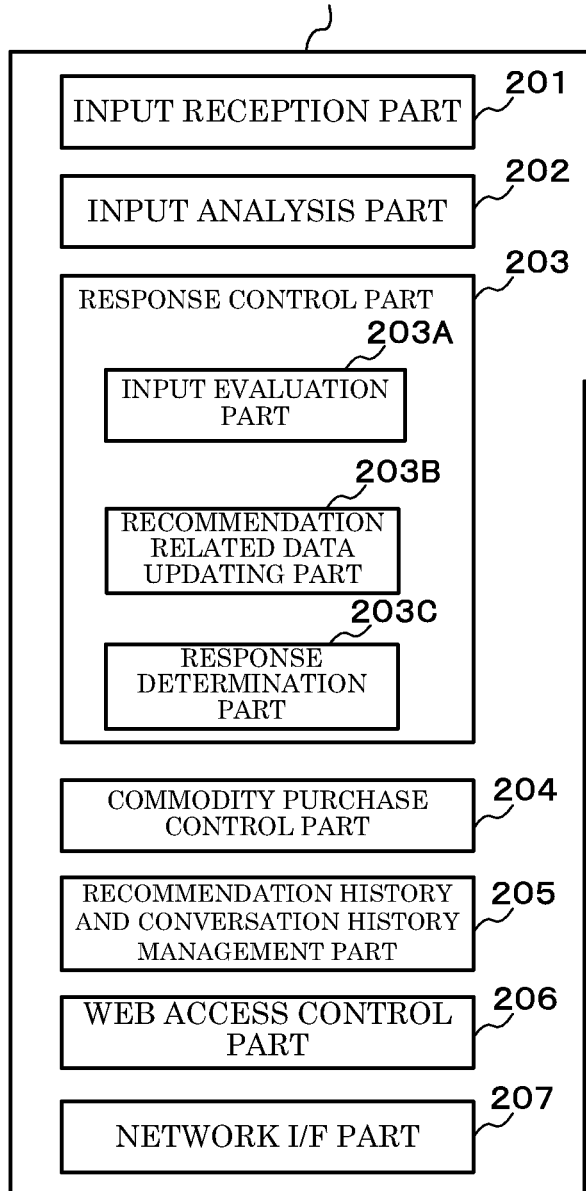
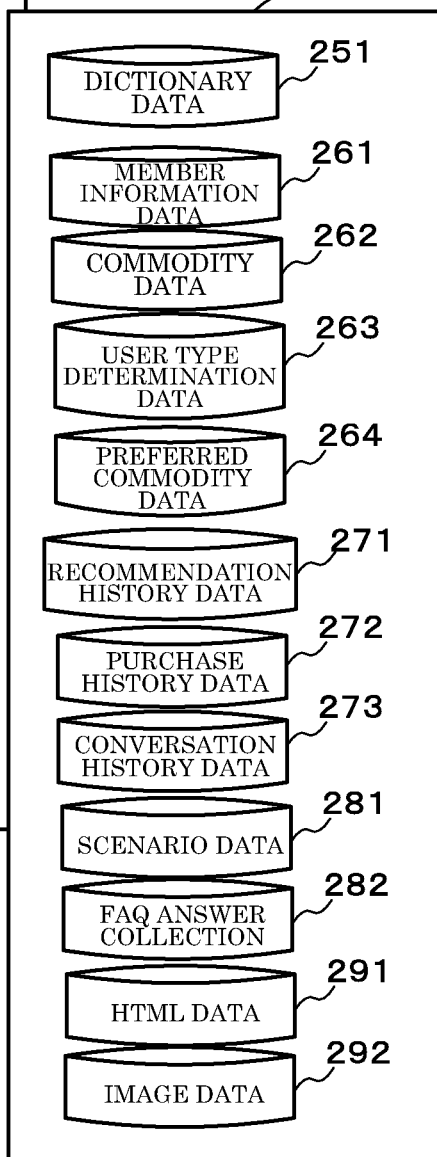

FIG. 9

261 MEMBER INFORMATION DATA

| USER ID | · AUTOMATICALLY NUMBERED ID |
|---|---|
| PASSWORD | · USED FOR AUTHENTICATION UPON LOGGING-IN |
| USER TYPE | ·A<br>·C |
| NAME | · NICKNAME |
| SEX | · MALE<br>· FEMALE |
| OCCUPATION | · STUDENT<br>· COMPANY EMPLOYEE |
| AGE | · 10'S TO 20'S<br>· 30'S TO 40'S<br>· 50'S OR MORE |
| DATE OF BIRTH | · MONTH OF BIRTH |
| HABITATION AREA | · TOHOKU<br>· KANTO<br>· KANSAI |
| MARRIAGE | · MARRIED<br>· UNMARRIED |
| HOBBIES | · OVERSEAS TRAVEL<br>· MOVIE APPRECIATION |
| INTERESTING CATEGORIES | · TRAVEL<br>· FASHION |
| UNINTERESTING CATEGORIES | · THE INTERIOR<br>· CARS |
| EVENTS OF PERSONAL INTEREST | · NEW YEAR'S<br>· VALENTINE'S DAY |
| PURCHASE HISTORY | · COMMODITIES PURCHASED LAST TIME<br>· CATEGORIES OF OFTEN PURCHASED COMMODITIES |
| PURCHASE PRICES | · AVERAGE<br>· TOTAL AMOUNT (ACCUMULATED AMOUNT) |
| NUMBER OF TIMES OF VISITING | · 5 TO 9 TIMES<br>· 10 OR MORE TIMES |
| DEGREE OF SATISFACTION | · A NUMBER OF TIMES AT WHICH A THANKS BUTTON IS CLICKED |

FIG. 10

262 COMMODITY DATA

| COMMODITY ID | · COMMODITY ID |
|---|---|
| COMMODITY NAME | · COMMODITY NAMES |
| MAKER NAME | · MANUFACTURER NAME |
| COMMODITY CATEGORY | · COMMODITY CATEGORIES<br>· CATEGORIES CLASSIFIED BY PURPOSES |
| DETAILED INFORMATION | · CONTENT QUANTITY<br>· INGREDIENTS<br>· COMMODITY EXPLANATION |
| RECOMMENDATION INFORMATION | · WORDS OF RECOMMENDING SAID PRODUCT<br>· SEASONAL RECOMMENDATION MESSAGES |
| DISCOUNT INFORMATION | · DISCOUNT AND CAMPAIGN INFORMATION |
| CUSTOMER INFORMATION | · CUSTOMERS' COMMENTS<br>· USE FEELING |
| NEW MODEL INFORMATION | · NEW MODEL RELATED TO SAID COMMODITY |
| ECONOMY-SIZE MODEL INFORMATION | · ECONOMY-SIZE MODEL RELATED TO SAID COMMODITY |

FIG. 12

KEY WORD AND PICKY-ABOUT
ITEM CORRESPONDENCE TABLE

| NO | KEY WORD | PICKY-ABOUT ITEM |
|---|---|---|
| 1 | MARINE-TASTE | DESIGN |
| | ADORABLE | |
| | IT IS COOL | |
| 2 | ECOLOGICAL | FUNCTIONALITY, EFFECT, AND EFFICACY |
| | QUICK | |
| | EXCELLENT EFFECT | |
| 3 | INTERESTING | FEELING |
| | BEAUTIFUL | |
| | AUSTERELY ELEGANT | |
| 4 | LOW COST | LOW PRICE |
| | INEXPENSIVE | |
| | ECONOMICAL | |
| 5 | FREE GIFT | BENEFIT |
| | FREE SHIPPING | |
| 6 | CONVENIENT | USABILITY |
| | COMPACT | |
| 7 | NEW PRODUCT | HOT-SELLING |
| | POPULAR | |
| 8 | SPORTY | TASTE |
| | VINTAGE | |
| 9 | LONG-LASTING | QUALITY |
| | FITTING | |
| 10 | PRESENT | USAGE SCENE |
| | MOTHER'S DAY | |

FIG. 13

USER TYPE
CORRESPONDENCE TABLE

| USER ATTRIBUTES | NO CORRESPONDING PICKY-ABOUT ITEM NO | SEX | AGE | USER TYPE |
|---|---|---|---|---|
| HAVING GREAT PICKINESS ABOUT FUNCTIONALITY, EFFECT, EFFICACY, USABILITY, AND QUALITY | 2 6 9 | MALE | 10'S TO 20'S | A |
| | | | 30'S TO 40'S | B |
| | | | 50'S OR MORE | C |
| | | FEMALE | 10'S TO 20'S | D |
| | | | 30'S TO 40'S | E |
| | | | 50'S OR MORE | F |
| HAVING GREAT PICKINESS ABOUT A DESIGN, FEELING, AND TASTE | 1 3 8 | MALE | 10'S TO 20'S | G |
| | | | 30'S TO 40'S | H |
| | | | 50'S OR MORE | I |
| | | FEMALE | 10'S TO 20'S | J |
| | | | 30'S TO 40'S | K |
| | | | 50'S OR MORE | L |
| HAVING GREAT PICKINESS ABOUT LOW PRICES | 4 | MALE | 10'S TO 20'S | M |
| | | | 30'S TO 40'S | N |
| | | | 50'S OR MORE | O |
| | | FEMALE | 10'S TO 20'S | P |
| | | | 30'S TO 40'S | Q |
| | | | 50'S OR MORE | R |
| HAVING GREAT PICKINESS ABOUT BENEFIT, HOT-SELLING COMMODITIES, AND USAGE SCENES | 5 7 10 | MALE | 10'S TO 20'S | S |
| | | | 30'S TO 40'S | T |
| | | | 50'S OR MORE | U |
| | | FEMALE | 10'S TO 20'S | V |
| | | | 30'S TO 40'S | W |
| | | | 50'S OR MORE | X |

FIG. 18

BASIC USER TYPES

| BASIC USER TYPE | PICKY-ABOUT ITEM | SCORE |
|---|---|---|
| TYPE-1 | BEING PICKY ABOUT A PRODUCT | 20~40 |
| | BEING PICKY ABOUT A PRICE | 75~95 |
| | ACCEPTING RECOMMENDATION | 75~95 |
| TYPE-2 | BEING PICKY ABOUT A PRODUCT | 80~100 |
| | BEING PICKY ABOUT A PRICE | 80~100 |
| | ACCEPTING RECOMMENDATION | 0~10 |
| TYPE-3 | BEING PICKY ABOUT A PRODUCT | 30~50 |
| | BEING PICKY ABOUT A PRICE | 40~60 |
| | ACCEPTING RECOMMENDATION | 50~60 |

FIG. 21

USER TYPE

| CLASSIFICATION | TYPE | CHARACTERISTICS OF TYPE | CONVERSATION |
|---|---|---|---|
| PICKY GROUP | A | HAVING PICKINESS ABOUT A PRODUCT AND HAVING LITTLE OR NO PICKINESS ABOUT A PRICE | · WHAT "EFFECT" IS AVAILABLE?<br>· "IT'S A GOOD BARGAIN." NO RESPONSE |
| | C | HAVING PICKINESS ABOUT A PRODUCT AND ALSO HAVING PICKINESS ABOUT A PRICE | · WHAT IS YOUR CRITERION TO DECIDE TO BUY? AFTER ALL, "COST PERFORMANCE", ISN'T IT. |
| | I | HAVING PICKINESS ABOUT A PRICE AND HAVING LITTLE OR NO PICKINESS ABOUT A PRODUCT | · IF IT'S INEXPENSIVE, I'LL BUT IT |
| PARTIALLY PICKY GROUP | B | HAVING PICKINESS ABOUT A PRODUCT AND HAVING MODERATE PICKINESS ABOUT A PRICE | IT IS GOOD IN PERFORMANCE FOR ITS PRICE. |
| | F | HAVING PICKINESS ABOUT A PRICE AND HAVING MODERATE PICKINESS ABOUT A PRODUCT | · ALTHOUGH THE PRICE IS LIKE THIS, IT'S THE BEST ONE IN A DESIGN. |
| SLIGHTLY PICKY GROUP | D | HAVING NO PICKINESS ABOUT A PRICE AND HAVING MODERATE PICKINESS ABOUT A PRODUCT | · REGARDLESS OF BEING EXPENSIVE OR INEXPENSIVE, WHEN IT'S STRONG, IT'S ALL RIGHT. |
| | H | HAVING NO PICKINESS ABOUT A PRODUCT AND HAVING MODERATE PICKINESS ABOUT A PRICE | · THAT PRODUCT, I THINK IT'S COMPARATIVELY INEXPENSIVE. |
| NORMALLY PICKY GROUP | E | HAVING MODERATE PICKINESS ABOUT A PRODUCT AND HAVING MODERATE PICKINESS ABOUT A PRICE | · I THINK IT'S NICE IF IT IS REASONABLE. |
| NON-PICKY GROUP | G | HAVING NO PICKINESS ABOUT A PRODUCT AND HAVING NO PICKINESS ABOUT A PRICE | · ANY ONE IS FINE. |

FIG. 25

CONVERSATION EXAMPLE (2) RESPONDING FOR RECOMMENDATION AND PURCHASED COMMODITY EVALUATION COLLECTION

621

CONCIERGE: WELCOME! MR. (OR MS.) YY, THANK YOU FOR YOUR PATRONAGE. HOW ARE YOU? WE ARE NOW CONDUCTING A CAMPAIGN OF PROVIDING DOUBLED POINTS FOR ALL COMMODITIES. PLEASE RELAX AND ENJOY SHOPPING. WELL, HOW ABOUT THE DIGITAL CAMERA XXX2 OF THE MAKER 2 YOU PURCHASED THE OTHER DAY? — 622

MR. (OR MS.) YY: IT'S GOOD BECAUSE IT'S VERY LIGHT-WEIGHT, COMPACT, AND CONVENIENT TO CARRY. — 623

CONCIERGE: OH, IS THAT SO. TODAY, WHAT ARE YOU LOOKING FOR? THERE IS A COMMODITY I REALLY WANT TO RECOMMEND TO MR. (OR MS.) YY. MAY I INTRODUCE IT? — 624

MR. (OR MS.) YY: ES, GO AHEAD. — 625

CONCIERGE: THE BELOW FIVE COMMODITIES ARE RECOMMENDED. A WIRELESS HEADSET XXX1 IS PARTICULARLY POPULAR AND RECOMMENDED. CONNECTION IS EASY AND IT'S LIGHT-WEIGHT, SO IT IS THE RECOMMENDED COMMODITY ALSO FOR WOMEN. — 626

⇩

THE SYSTEM DISPLAYS THE FIVE COMMODITIES. — 627

CONCIERGE: WILL YOU LOOK AT THE PARTICULARLY RECOMMENDED WIRELESS HEADSET XXX1 IN DETAILS? — 628

MR. (OR MS.) YY: YES, GO AHEAD. — 629

⇩

THE SYSTEM DISPLAYS URL FOR SHOWING DETAILED COMMODITY INFORMATION OF XXX1. — 630

FIG. 27

CONVERSATION EXAMPLE (4) CUSTOMER
COMPLAINT RESPONDING

661 —

MR. (OR MS.) XX: ABOUT THE SOCKS I BOUGHT THE OTHER DAY, I WANT TO RETURN THEM BECAUSE THE COLOR IS QUITE DIFFERENT FROM THAT I THOUGHT. — 662

CONCIERGE: I'M REALLY VERY SORRY. AS FOR THE DETAILS ABOUT THE RETURN, I'LL PUT YOU THROUGH TO AN OPERATOR, SO PLEASE TALK THERE. — 663

THE SYSTEM DISPLAYS A SCREEN OF A TELEPHONE AND A LIVE CHAT AND STARTS RESPONDING BY THE OPERATOR. — 664

CONVERSATION EXAMPLE (5) COMMODITY
SEARCH TO PURCHASE RESPONDING

FIG. 30
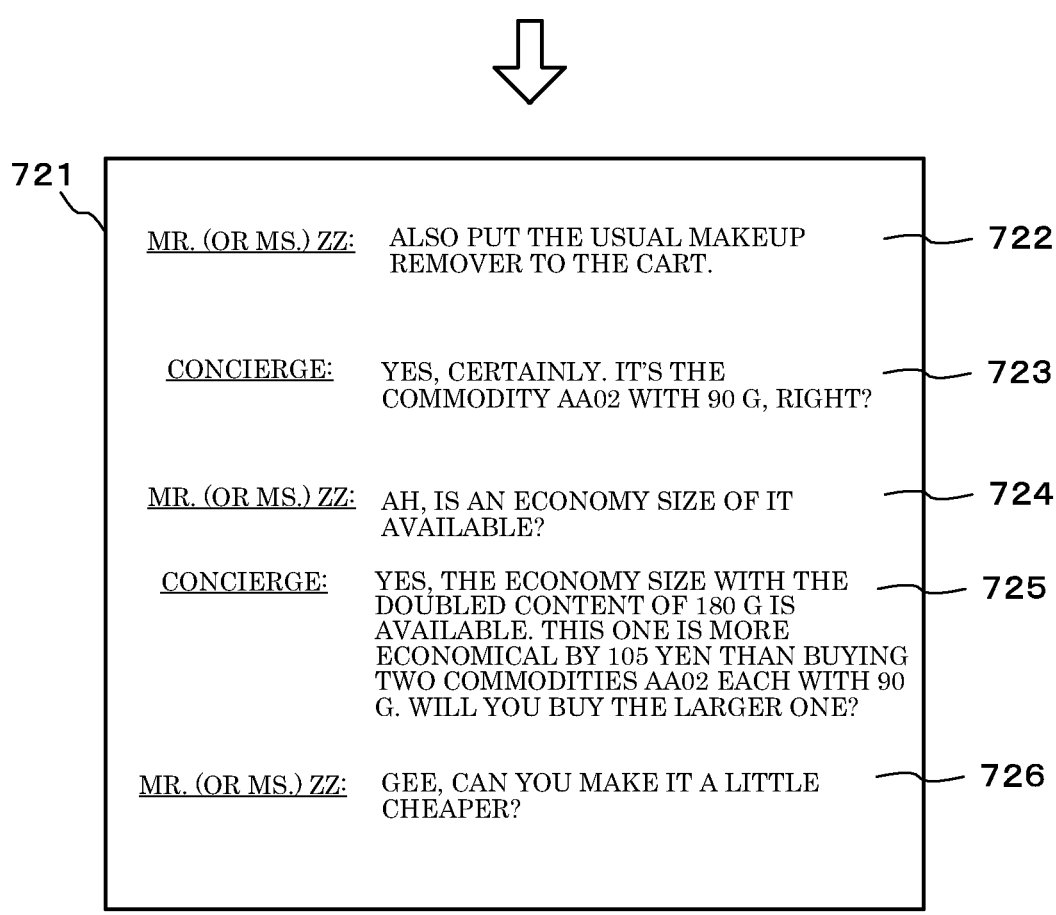

FIG. 32

741

| | |
|---|---|
| MR. (OR MS.) ZZ: | OH, THAT'S IT! I WANT TO DO A FRECKLE COUNTERMEASURE WELL. — 742 |
| CONCIERGE: | FRECKLE-RELATED COMMODITIES? PLEASE HAVE A LOOK AT THE BELOW LIST. — 743 |

⇩

THE LIST OF FRECKLE-RELATED COMMODITIES IS DISPLAYED. — 744

| | |
|---|---|
| CONCIERGE: | WELL, MR. (OR MS.) ZZ, YOU HAVE NOT TRIED ANY FRECKLE COUNTERMEASURE COMMODITY OTHER THAN THE MAKEUP REMOVER, HAVEN'T YOU. DO YOU HAVE ANY QUESTION? — 745 |
| MR. (OR MS.) ZZ: | I HAVE NO IDEA WHICH ONE IS GOOD. — 746 |
| CONCIERGE: | CERTAINLY, ANY ONE WILL WAVER. THESE COMMODITIES ARE CLASSIFIED BY PURPOSES SUCH AS "PREVENTION OF FRECKLES", "CARING FOR FRECKLES", AND "CONCEALING FRECKLES". MR. (OR MS.) ZZ, WHAT DO YOU EXPECT? — 747 |
| MR. (OR MS.) ZZ: | I WANT TO REMOVE FRECKLES. — 748 |
| CONCIERGE: | THEN, I THINK THE SPOT WHITENING CREAM "COMMODITY AA03" IS GOOD. — 749 |

FIG. 33

751

752 — MR. (OR MS.) ZZ: DOES THIS CLEAR THE FRECKLES?

753 — CONCIERGE: THOUGH I THINK THERE ARE DIFFERENCES FROM INDIVIDUAL TO INDIVIDUAL, THE ACTIVE INGREDIENT @@ HAS A FUNCTION OF ## AND THERE ARE A LOT OF CUSTOMERS FEELING THE EFFECT.

754 — THE SYSTEM SEQUENTIALLY DISPLAYS COMMENTS OF CUSTOMERS IN A POP-UP MANNER.

755 — MR. (OR MS.) ZZ: IT SEEMS NICE···

756 — CONCIERGE: THIS IS DEVELOPED FOR CARING IN NIGHT IN WHICH THE SKIN CYCLE IS HEIGHTENED. AFTER WASHING YOUR FACE IN NIGHT, YOU JUST APPLY IT TO YOUR SKIN BY TAPPING WITH YOUR FINGER TIPS.

757 — MR. (OR MS.) ZZ: BUT IT'S NOT NOW, I'LL BUY IT ON A PAYDAY!

758 — CONCIERGE: YES, I'M LOOKING FORWARD TO YOUR EXAMINING NEXT TIME. ALSO FOR THIS COMMODITY, I'LL INFORM YOU OF THE UPCOMING INFORMATION ABOUT A CAMPAIGN AND OTHERS.

| | | |
|---|---|---|
| MR. (OR MS.) ZZ: | HOW MUCH IS THE SHIPPING COST? | — 772 |
| CONCIERGE: | WELL, IT'S 500 YEN. IF YOU BUY THE COMMODITY AA03 YOU WERE WAVERING WHETHER TO BUY A WHILE AGO, THE TOTAL AMOUNT IS 10,890 YEN, AND THE FREE SHIPPING IS APPLIED. IF IT'S OK WITH YOU, ···. | — 773 |
| MR. (OR MS.) ZZ: | CERTAINLY, ··· WHAT SHOULD I DO. | — 774 |
| CONCIERGE: | I THINK IT IS GOOD TIME FOR CARING FOR THE SKIN HAVING THE EXPOSURE TO ULTRAVIOLET RAYS DURING THE SUMMER SEASON. NOW, POINTS ARE DOUBLED. | — 775 |
| MR. (OR MS.) ZZ: | HM, WELL, I'LL BUY IT! | — 776 |
| CONCIERGE: | YES, THANK YOU! I'M SURE, THE AUTUMN NIGHT WILL BE FUN BY THIS CARING. | — 777 |

⇩

:TO A PURCHASE PROCEDURE (A  
CART INFORMATION  
CONFIRMATION SCREEN OR THE  
LIKE IS DISPLAYED.): — 778

FIG. 37

EXAMPLE OF RECOMMENDATION DETERMINATION

| NO | EXAMPLE OF INPUT FROM USER | DETERMINATION ON INPUT FROM USER | RECOMMENDATION POLICY |
|---|---|---|---|
| 1 | · SO IT IS<br>· IT'S TRUE.<br>· CERTAINLY<br>· I'M NOT SO SURE.<br>· NOT REALLY. | AFFIRMATION/ NEGATION (SIMPLE) | PROCEEDING TO A FLOW IN WHICH THAT COMMODITY OR A COMMODITY DIFFERENT FROM THAT COMMODITY IS RECOMMENDED WHILE PROBING WHETHER THE USER HAS PURCHASING WILLINGNESS. |
| 2 | · AYE.<br>· IT IS SO.<br>· I KNOW IT.<br>· IT'S NICE.<br>· IS THERE ANYTHING ELSE? | INTERESTED/ UNINTERESTED | |
| 3 | · IT IS INORGANIC FEELING, RATHER THAN COOL ONE, ISN'T IT<br>·I THINK MUCH COOL ONE IS BETTER.<br>· IT'S UNCOOL. | A COMMENT INCLUDING EVALUATION ITEMS SUCH AS A DESIGN, A PRICE, A FUNCTION, USABILITY, AND REPUTATION | |
| 4 | · CERTAINLY, THE DESIGN IS GOOD, BUT THE PRICE IS ···.<br>· FOR THE PRICE, THE DESIGN IS ···.<br>· BOTH THE DESIGN AND THE PRICE ARE NOT GOOD ENOUGH | AFFIRMATION/ NEGATION (COMPOSITE) | AFFIRMATION AND NEGATION RELATED TO EVALUATION TARGET ITEMS => RECOMMENDING A COMMODITY BY PROVIDING FOLLOW-UP INFORMATION PERTINENT TO THE TARGETED EVALUATION ITEMS AND ADDING OTHER EVALUATION ITEMS; AND PROCEEDING TO A FLOW IN WHICH THAT COMMODITY OR A COMMODITY DIFFERENT FROM THAT COMMODITY IS RECOMMENDED WHILE PROBING WHETHER THE USER 10 HAS PURCHASING WILLINGNESS. |
| 5 | · IS THERE ANY BENEFIT FOR A MEMBER?<br>· WHEN THE SALE STARTS FROM? | OTHERS | NO RELATION WITH THE ABOVE-DESCRIBED PATTERNS => WHEN THE USER MAKES AN INPUT OR AFTER THAT INPUT, MAKING A CONFIRMATION FOR THAT INPUT AND INTRODUCING THE NEXT COMMODITY OR STANDING BY |

INFORMATION PROVISION SYSTEM, INFORMATION PROVISION METHOD, AND STORAGE MEDIUM

CROSS-REFERENCE TO RELATED APPLICATION

This application is a continuation of U.S. application Ser. No. 15/268,163 filed Sep. 16, 2016, the priority benefit of which is claimed and the contents of which are incorporated by reference. That application claims the benefit of Japanese Patent Application No. 2015-188769, filed on Sep. 25, 2015, which application is incorporated herein by reference in its entirety and the priority benefit of which is claimed.

FIELD OF THE INVENTION

The present invention relates to an information provision system which provides information in response to a user input.

BACKGROUND OF THE INVENTION

In recent years, vigorous studies on a system which is operable to search an optimum solution to a question from a user and to respond thereto have been carried out. Further, in connection with the development of the above-mentioned system, studies on a natural language processing technology and an artificial intelligence technology for analyzing a syntax and meaning of a question inputted from a user and for searching a solution to the question have also been in progress.

For example, a question answering system which is operable to output answer candidates evaluated as optimum ones in response to a question has been proposed (refer to U.S. Patent Application Publication No. 2015/0026106). This question answering system is configured such that answer candidates to a question are searched; with respect to each combination of each of the answer candidates and the question, a score indicating a degree of each of the answer candidates being a correct answer to said question is calculated by using a learning function; and based on the calculated score, an answer candidate which is most likely to be a correct answer to the question is outputted.

In addition, a request content identification system which is operable to analyze an input sentence obtained by describing a request from a user in a natural language; to determine whether the request content of said input sentence corresponds to the request content previously defined; and to thereby identify and output the request content of the input sentence has been disclosed (refer to U.S. Patent Application Publication No. 2009/0099840).

On the other hand, on the existing Internet shopping sites, on each of which a user purchases commodities and the like via the Internet, a recommendation function with which when a user selects a desired commodity by a name or a category of a commodity, commodities which other user having purchased the selected commodity has purchased concurrently with purchasing the selected commodity and commodities which this other user has so far purchased are presented as "recommended commodities" has been provided.

However, although on the above-described existing Internet shopping sites, by using the recommendation function, the commodities purchased by other user can be presented as the recommended commodities to a utilizing user, in the relationship between the utilizing user and other user, only the point that the utilizing user and other user have purchased the common commodity (or the utilizing user and other user have examined purchasing of the common commodity) is shared by the utilizing user and other user, no information based on actual preference or attributes of the utilizing user is available, and any information related to optimum commodities based on preference of a utilizing user cannot be presented.

In addition, on the above-described existing Internet shopping sites, a function with which even in a case where a utilizing user inputs ambiguous search words, inference based on the search words is conducted, and commodities which are appropriate for the utilizing user are presented is not available. In addition, a function with which through a dialogue with a utilizing user, words for determining preference of the utilizing user are drawn out or a side of an Internet shopping site actively induces a utilizing user to purchase a specific commodity has also not been provided.

In the above-described question answering system disclosed in U.S. Patent Application Publication No. 2015/0026106 and the request content identification system disclosed in U.S. Patent Application Publication No. 2009/0099840, in response to a user's input, answer candidates can be presented. However, the mere combination of these systems and the system of the existing Internet shopping sites does not allow preference and the like of a utilizing user to be grasped through a dialogue with said utilizing user doing Internet shopping. As a result, a function to present appropriate recommended commodities to said utilizing user cannot be realized.

Therefore, an object of the present invention is to provide an information provision system which is operable to determine preference of a utilizing user through a dialogue with the user shopping on an Internet shopping site and based on the determined preference, to determine a recommended commodity.

BRIEF SUMMARY OF THE INVENTION

The present invention provides an information provision system, an information provision method, and a storage medium described below.

A first aspect according to the present invention is an information provision system (for example, an information provision system 1) including:

an input reception device (for example, an input reception part 201 in an information provision server 200 shown in FIG. 7) for receiving an input (for example, character string data obtained from a character string and voice inputted by a user 10 from a user terminal 100) by a user from a user terminal (for example, the user terminal 100) operated by the user (for example, the user 10);

a response determination device (for example, a response determination part 203C included in a response control part 203 in the information provision server 200 shown in FIG. 7) for determining contents of a response (for example, a response sentence and a sound effect output instruction transmitted from the information provision server 200 to the user terminal 100) to be outputted to the user terminal in response to the input; and a user type determination device (for example, a recommendation related data updating part 203B included in the response control part 203 in the information provision server 200 shown in FIG. 7) for determining a user type of the user (for example, user types A to X shown in FIG. 13) by using words (for example, key words associated with picky-about items shown in FIG. 12) obtained based on the input, the response determination device determining a commodity or a service to be presented to the user based on the determined user type of the user, the response determination device controlling information (for example, a commodity name, image data, detailed information (a URL), and the like) pertinent to the determined commodity or service so as to be included in the contents of the response (for example, such that such information pertinent to the commodity, included in the contents of the response, is displayed as a list of recommended commodities in a commodity display part 126 shown in FIG. 3).

By employing the above-described configuration of the present invention, through a dialogue with a user utilizing an Internet shopping site, preference of the user is determined and based on the determined preference, recommended commodities to be presented to the user are determined. Therefore, the preference of the user is grasped in a specific and detailed manner and commodities which are appropriate for the user are presented as the recommended commodities.

In the first aspect, a second aspect according to the present invention is configured such that based on the determined user type of the user and a category (for example, a category selected by the user on a screen of an Internet shopping site displayed on the user terminal 100 and a category of the displayed and selected commodity) selected by the user on the user terminal, the response determination device determines the commodity or the service to be presented to the user.

By employing the above-described configuration of the present invention, in the form in which the category of the commodity or the like in which the user utilizing the Internet shopping site is currently interested is reflected, recommended commodities are determined. Therefore, the preference of the user and the category in which the user is currently interested are grasped in a specific and detailed manner, and commodities which are appropriate for the user are presented as the recommended commodities.

In the first aspect, a third aspect according to the present invention is configured such that based on purchase information (for example, information pertinent to the purchase or the reservation of a commodity or a service such as purchase results grasped from purchase history data (including ranking or the like related to purchased commodities in a predetermined period of time), purchase examining commodities, and commodity browse history) related to a user whose user type is the same as or similar to the determined user type of the user (for example, having predetermined communality with the user type of the user or belonging to the same superordinate classification), the response determination device determines the commodity or the service to be presented to the user.

By employing the above-described configuration of the present invention, based on the commodities purchased by other user whose user type is the same as or similar to the user type of the user utilizing the Internet shopping site, the recommended commodities are determined. Therefore, the commodities or the like purchased by other user having the preference in common with this user are grasped in a specific and detailed manner, and commodities which are appropriate for the user are presented as the recommended commodities.

In the first aspect, a fourth aspect according to the present invention is configured such that based on the words obtained based on the input and attributes of the user (for example, sex and age of the user), the user type determination device determines the user type of the user.

By employing the above-described configuration of the present invention, a user type of a user having the same attributes as those of the user utilizing the Internet shopping site is set, and based on commonality in such user attributes, recommended commodities are determined. Therefore, the preference of the user and the attributes of the user are grasped in a specific and detailed manner, and commodities which are appropriate for the user are presented as the recommended commodities.

In the first aspect, a fifth aspect according to the present invention is configured such that in accordance with the words received over time, the user type determination device updates the user type of the user (for example, after the lapse of a predetermined period of time, when predetermined words inputted by the user are often extracted and the preference or the picky-about items of the user seem to change to others, in addition to the current user type (or instead of the current user type), a new user type is set).

By employing the above-described configuration of the present invention, when the preference of the user utilizing the Internet shopping site has changed, based on the user type for which the changed preference is reflected, recommended commodities are determined. Therefore, in accordance with the change in the preference of the user according to the lapse of time, said preference is grasped in a specific and detailed manner, and commodities which are appropriate for the user are presented as the recommended commodities on an as needed basis.

A sixth aspect according to the present invention is an information provision method implemented on an information provision server in an information provision system, the method including:

an input reception step of receiving an input by a user from a user terminal operated by the user;

a response determination step of determining contents of a response to be outputted to the user terminal in response to the input; and a user type determination step of determining a user type of the user by using words obtained based on the input, wherein at the response determination step, based on the determined user type of the user, the commodity or the service to be presented to the user is determined, and information pertinent to the determined commodity or service is controlled so as to be included in the contents of the response.

By employing the above-described configuration of the present invention, through a dialogue with a user utilizing an Internet shopping site, preference of the user is determined and based on the determined preference, recommended commodities to be presented to the user are determined. Therefore, the preference of the user is grasped in a specific and detailed manner and commodities which are appropriate for the user are presented as the recommended commodities.

A seventh aspect according to the present invention is a non-transitory computer-readable storage medium having stored therein a program for causing a computer to function as:

an input reception device for receiving an input by a user from a user terminal operated by the user;

a response determination device for determining contents of a response to be outputted to the user terminal in response to the input; and are type determination device for determining a user type of the user by using words obtained based on the input, the response determination device determining a commodity or a service to be presented to the user based on the determined user type of the user, the response determination device controlling information pertinent to the determined commodity or service so as to be included in the contents of the response.

By employing the above-described configuration of the present invention, through a dialogue with a user utilizing an Internet shopping site, preference of the user is determined and based on the determined preference, recommended commodities to be presented to the user are determined. Therefore, the preference of the user is grasped in a specific and detailed manner and commodities which are appropriate for the user are presented as the recommended commodities.

By the information provision system according to the present invention, through a dialogue with a user utilizing an Internet shopping site, preference of the user is determined, and based on said determined preference, recommended commodities are determined. Therefore, the preference of the user is grasped in a specific and detailed manner, and commodities matching such preference are presented as recommended commodities. In addition, the commodities matching such preference are presented as the recommended commodities, thereby allowing various advantages in Internet shops, such as enhancing of sales per customer (including promotion of up-selling and cross-selling), boosting of profitability, and an increase in repeat users, to be expected.

BRIEF DESCRIPTION OF THE DRAWINGS

FIG. 7 is a functional block diagram showing an information provision server in the information provision system according to the one embodiment of the present invention;

FIG. 9 is a diagram showing an example of member information data in the information provision system according to the one embodiment of the present invention;

FIG. 10 is a diagram showing an example of commodity data in the information provision system according to the one embodiment of the present invention;

FIG. 12 is a diagram showing an example of a key word and picky-about item correspondence table in a first pattern of user type management in the information provision system according to the one embodiment of the present invention;

FIG. 13 is a diagram showing an example of a user type correspondence table in the first pattern of the user type management in the information provision system according to the one embodiment of the present invention;

FIG. 18 is a diagram showing an example of basic user types in a second pattern of the user type management in the information provision system according to the one embodiment of the present invention;

FIG. 21 is a diagram showing an example of basic user types in a third pattern of the user type management in the information provision system according to the one embodiment of the present invention;

FIG. 25 is a diagram exemplifying a situation in which a user and the concierge have a conversation on a conversation screen in the information provision system according to the one embodiment of the present invention;

FIG. 27 is a diagram exemplifying a situation in which a user and the concierge have a conversation on a conversation screen in the information provision system according to the one embodiment of the present invention;

FIG. 30 is a diagram exemplifying the situation in which the user and the concierge have the conversation on the conversation screen in the information provision system according to the one embodiment of the present invention;

FIG. 32 is a diagram exemplifying the situation in which the user and the concierge have the conversation on the conversation screen in the information provision system according to the one embodiment of the present invention;

FIG. 33 is a diagram exemplifying the situation in which the user and the concierge have the conversation on the conversation screen in the information provision system according to the one embodiment of the present invention;

FIG. 35 is a diagram exemplifying the situation in which the user and the concierge have the conversation on the conversation screen in the information provision system according to the one embodiment of the present invention;

FIG. 37 is a diagram for explaining how to determine recommendation timing at which a recommended commodity is displayed and how to conduct recommendation in the information provision system according to the one embodiment of the present invention.

DETAILED DESCRIPTION OF THE PREFERRED EMBODIMENT

Hereinafter, an information provision system 1 according to one embodiment of the present invention will be described with reference to the accompanying drawings.

Figure 1:
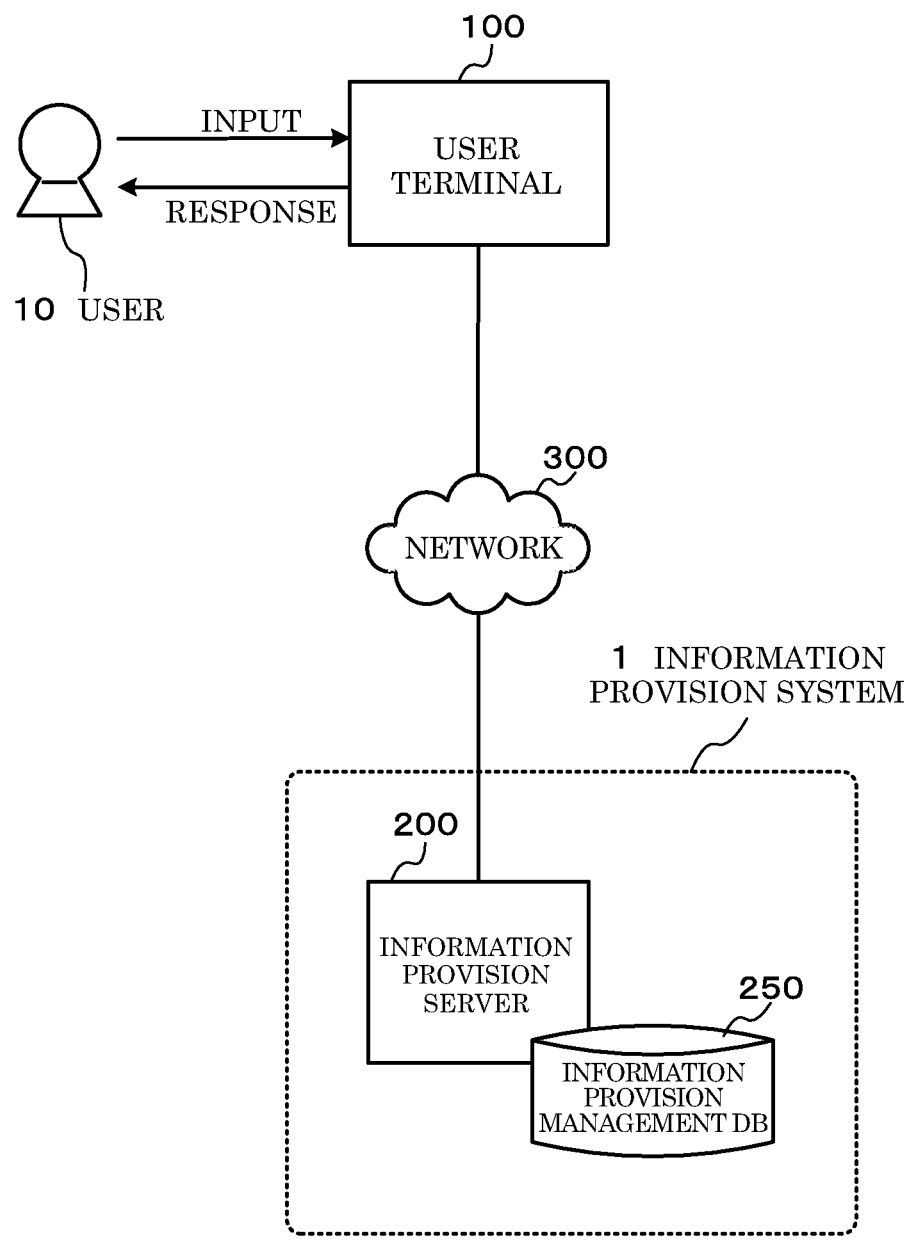
FIG. 1 is a diagram illustrating an outline of an information provision system according to one embodiment of the present invention.

FIG. 1 is a diagram illustrating an outline of a system including the information provision system 1 which responds to an input, thereby providing customer service and sales on an Internet shop.

A user 10 inputs a character string into an input area of a predetermined WEB page displayed by a WEB browser which is executed on a user terminal 100 (refer to an upper portion in FIG. 1) (for example, by using a keyboard or a touch panel of the user terminal 100). Here, the character string inputted by the user 10 is in the form of a text (input sentence) in general; includes, for example, questions and the like related to products of a company providing a WEB site having the above-mentioned WEB page; and is represented by a natural language. Hereinafter, for the sake of convenience, an input from a user is referred to as an "input sentence". However, it is not required for the input from a user to be in the form of the text, and the input sentence means a variety of input character strings which include words and a part of a sentence.

In addition, here, the predetermined WEB page displayed by the WEB browser is, for example, a WEB page (site) of the so-called Internet shopping in which commodities are sold on the Internet. The user 10 causes the user terminal 100 to display information pertinent to detailed information and a purchasing procedure of a commodity as a response from the information provision system 1 according to the present embodiment and confirms the displayed information, thereby performing a conversation related to the commodity and the purchasing procedure.

It is to be noted that although in the present embodiment, the site of the Internet shopping on which the commodities are sold is described as an example, various sites on which convenience is provided for a user, such as sites of the Internet shopping on which services are provided and reservation or the like is made, are included as targets of the present invention.

The character string inputted by the user is provided via a network 300 to the information provision system 1 by the WEB browser of the user terminal 100. Here, the network 300 is, for example, a network including the Internet.

Upon receiving a character string from the user terminal 100, the information provision system 1 determines a character string (a response sentence in general) and a commodity (group) as a response corresponding to the character string and transmits this response via the network 300 to the user terminal 100. As described above, when the user 10 has input a character string in the input area of the WEB page, the response (character string) and information or the like related to a commodity corresponding thereto are displayed in an output area of the WEB page. For example, when the user 10 has input a question related to a commodity in the input area of the WEB page, an answer to the question is displayed in an response display area of the WEB page, and in some case, information or the like related to the commodity is displayed in an commodity display area.

The information provision system 1 is configured to include an information provision server 200. The information provision server 200 is provided with an information provision management DB(database) 250 including member information data and commodity data. The information provision server 200 determines a character string having contents which are appropriate as a response corresponding to the input received from the user terminal 100 based on data stored in the information provision management DB 250 and transmits response data to the user terminal 100 to cause the character string of said response to be displayed in the response display area (a response display area of a WEB page displayed by the WEB browser executed on the user terminal 100).

In addition, in response to the input received from the user terminal 100, the information provision server 200 determines information related to a recommended commodity by using this information provision management DB 250 and transmits response data to the user terminal 100 to cause the information related to the commodity (group) to be displayed in the commodity display area (a commodity display area of a WEB page displayed by the WEB browser executed on the user terminal 100).

Functions of the information provision server 200 and contents of the information provision management DB 250 will be described later in details.

Here, when the information provision system 1 is provided as a system which can be used by unspecified users, as the user 10, general users who ask questions to companies and organizations (related to commodities, services, and the like thereof) which provide WEB sites are supposed, and the user terminal 100 is a PC (personal computer) or the like in general which can be connected to the Internet or the like and the user 10 has.

In FIG. 1, the configuration is arranged such that the user 10 inputs a character string in the input area of the WEB site by using a keyboard or the like, thereby providing the information provision system 1 with a question and the like. However, any method or any route may be employed to input a character string to the information provision system 1. For example, when the user 10 issues a question by voice, this voice is subjected to voice recognition processing to be converted to a character string, and said converted character string can be provided for the information provision system 1. In addition, a printed question or the like is converted to a character string by using OCR (Optical Character Recognition), and said converted character string can also be provided for the information provision system 1.

It is to be noted that the information provision server 200 according to the present embodiment also has a function of a WEB server which is operable to perform data transmission and reception by a WEB browser executed on the user terminal 100 and a protocol such as HTTP and to cause said WEB browser to display a predetermined WEB page.

In addition, although the information provision server 200 is shown as one computer here, the information provision server 200 can also be configured as a plurality of computers, thereby allowing the same function to be shared and executed by the plurality of computers. In addition, the information provision management DB 250 can also be configured such that the data stored therein is divided into various units to be shared by a plurality of sites and computers.

Further, in the present embodiment, a plurality of information provision servers 200 can be arranged, and each of the information provision servers 200 is associated with one Internet shopping site or one site of a company providing commodities or the like. One Internet shopping site can also be subdivided to be realized by the plurality of information provision servers 200. Conversely, functions of a plurality of Internet shopping sites can also be realized by one information provision server 200.

Figure 2:
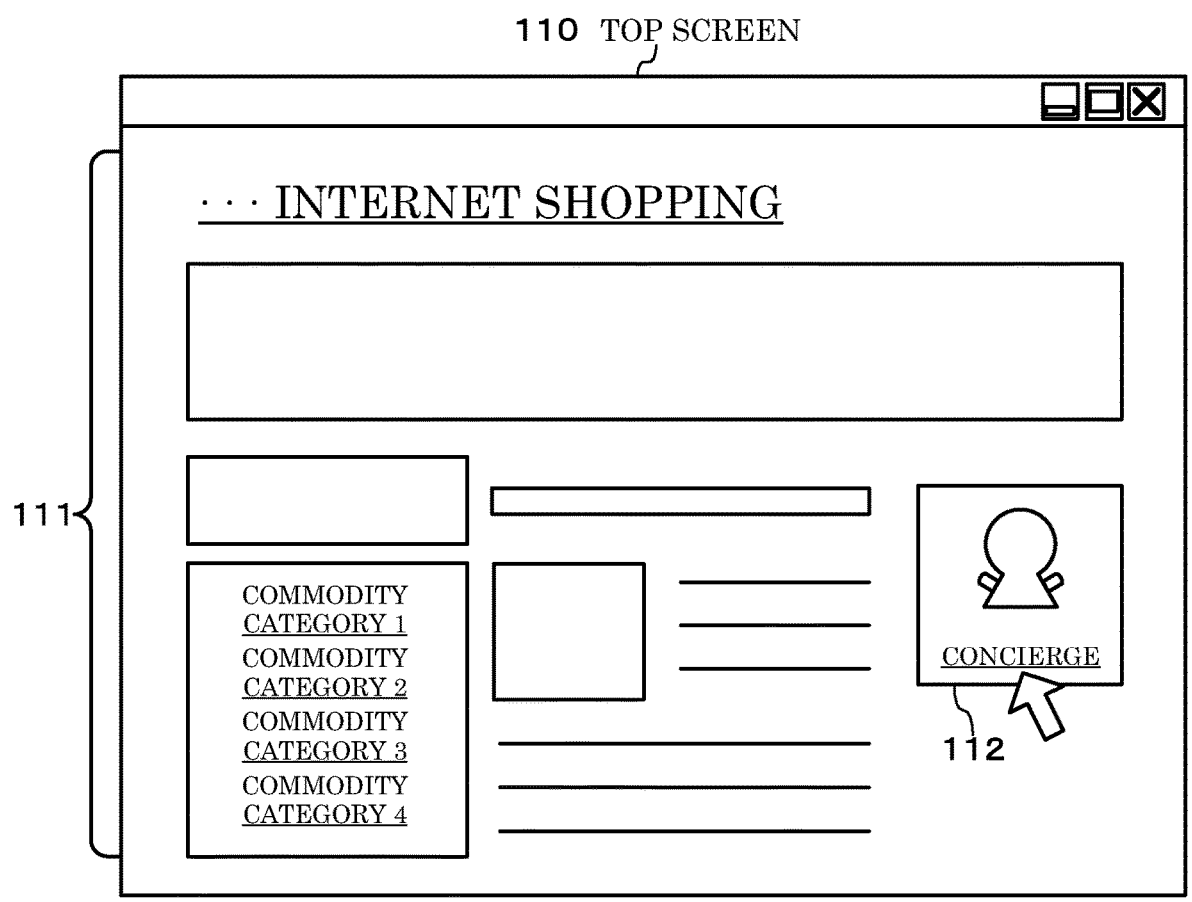
FIG. 2 is a diagram exemplifying a top screen of an Internet shopping site, according to the one embodiment of the present invention.

FIG. 2 is a diagram exemplifying a top screen 110 of an Internet shopping site. The user 10 activates a WEB browser on the user terminal 100, inputs a URL of the Internet shopping site there (selects the URL thereof from bookmarks, directly inputs the URL, and so forth), and displays the top screen 110 shown in FIG. 2 on a display of the user terminal 100.

On the top screen 110, a top screen display part 111 is arranged, and in an upper portion therein, a title is displayed and on a left side, a list of categories is displayed. The user 10 browses a variety of pieces of information displayed on this top screen display part 111 and clicks a linked text or image by using a mouse or the like, thereby causing information of a commodity to be displayed in a further detailed manner or conducting the procedure of purchasing a desired commodity. In addition, on a right side in the top screen display part 111, a concierge image 112 provided by the information provision system 1 according to the present embodiment is shown. The user 10 clicks this concierge image 112 by using the mouse or the like to select the concierge image 112, whereby the user 10 can have a conversation (the information provision system 1 responds to an input from the user 10) with the information provision system 1 with respect to the purchase of a commodity and the like.

In the information provision system 1 according to the present embodiment, the concierge image 112 represents a concierge (a guide or an agent) who provides the user 10 with a variety of pieces of information (by using artificial intelligence or the like).

Figure 3:
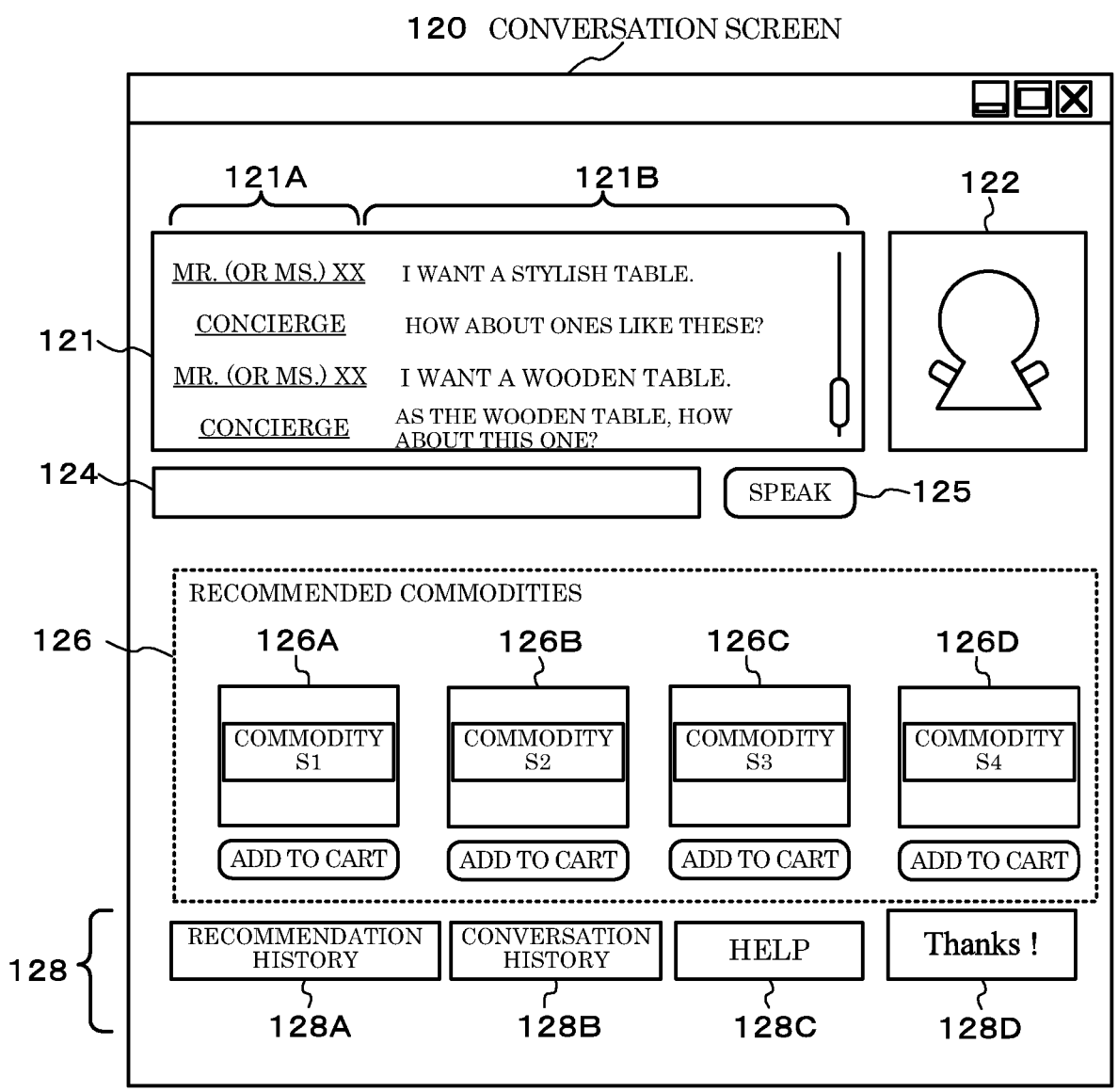
FIG. 3 is a diagram exemplifying a conversation screen on the Internet shopping site, according to the one embodiment of the present invention.

FIG. 3 is a diagram illustrating a conversation screen 120 displayed by the WEB browser on the user terminal 100 after the user 10 has selected the concierge image 112 in the top screen display part 111 shown in FIG. 2. Although upon selecting the concierge image 112, a login window for inputting a user ID and a password is displayed, here, the login window is omitted.

On the conversation screen 120 shown in FIG. 3, in an upper portion, a conversation display part 121 is arranged, and on a right side in the upper portion, a concierge image 122 is displayed. Below the conversation display part 121, an input part 124 in which a character string typed by the user 10 is inputted is arranged, and on a right side thereof, a "Speak" button 125 which functions as a transmission button for transmitting the character string inputted by the user 10 to the information provision system 1 is arranged.

Further, below the input part 124, a commodity display part 126 in which a list of commodities recommended by the information provision system 1 to the user 10 is displayed is arranged. In this example, in a commodity icon 126A, an image of a commodity S1 is shown, and therebelow, an "Add to Cart" button with which a commodity is put into a cart (a shopping basket temporarily used for purchasing) is displayed. In addition, in a commodity icon 126B, an image of a commodity S2 is shown, and therebelow, an "Add to Cart" button with which a commodity is put into a cart is displayed; in a commodity icon 126C, an image of a commodity S3 is shown, and therebelow, an "Add to Cart" button with which a commodity is put into a cart is displayed; and in a commodity icon 126D, an image of a commodity S4 is shown, and therebelow, an "Add to Cart" button with which a commodity is put into a cart is displayed.

Upon clicking the commodity icon such as the commodity icon 126A by the mouse or the like, detailed information of the corresponding commodity is displayed.

In the lowermost portion of the conversation screen 120, a button display part 128 is arranged, and in the button display part 128, a recommendation history button 128A, a conversation history button 128B, a HELP button 128C, and a Thanks button 128D are displayed. Here, the recommendation history button 128A is a button for displaying a recommendation history display screen (refer to FIG. 4); the conversation history button 128B is a button for displaying a conversation history display screen (refer to FIG. 5); the HELP button 128C is a button for displaying a HELP screen (not shown) related to the information provision system 1; and the Thanks button 128D is a button clicked when the user 10 appreciates or evaluates a response from the information provision system 1. A number of times at which the Thanks button 128D is clicked is used to determine a degree of satisfaction of the user 10.

Figure 4:
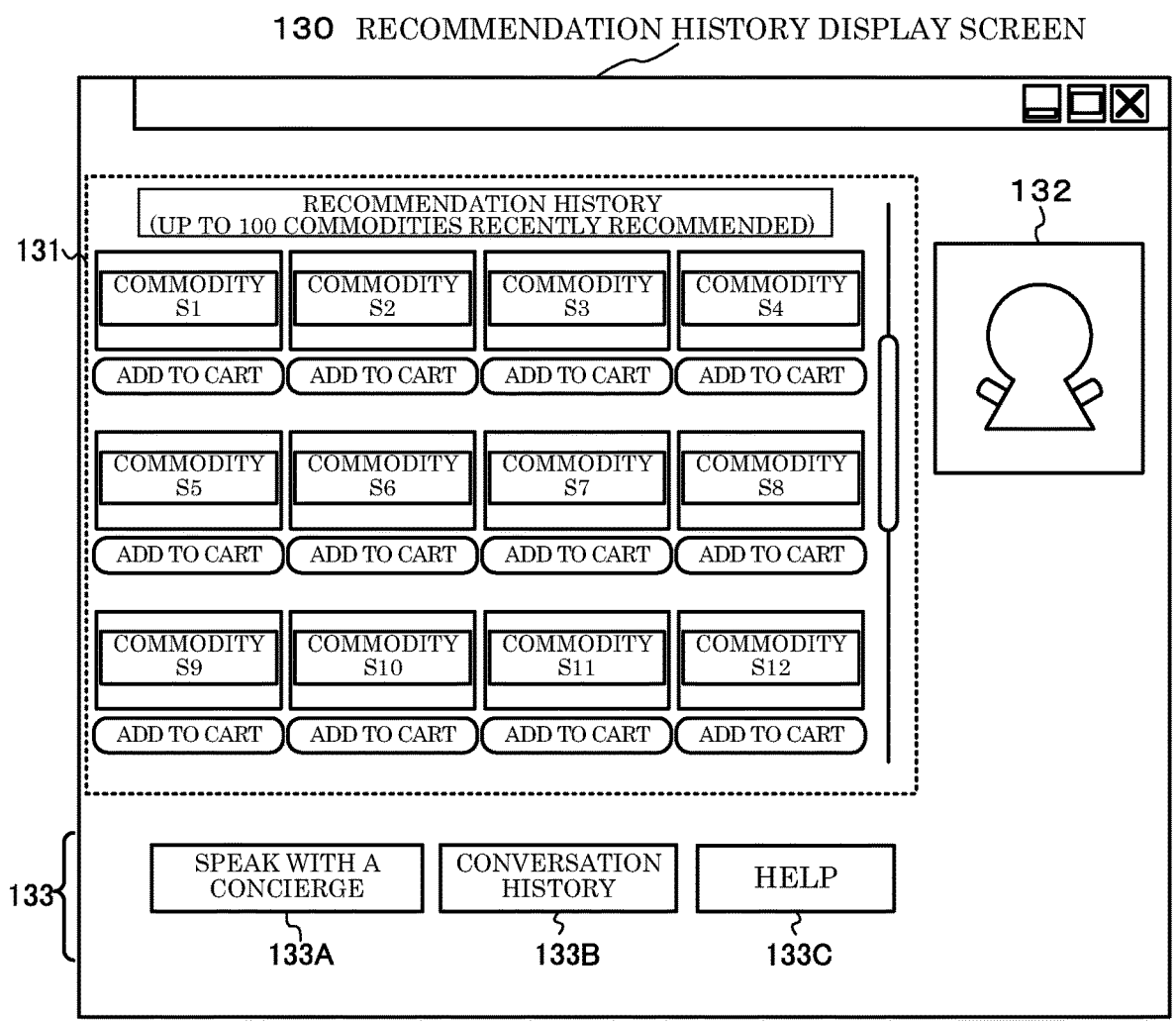
FIG. 4 is a diagram exemplifying a recommendation history display screen on the Internet shopping site, according to the one embodiment of the present invention.

FIG. 4 is a diagram illustrating a recommendation history display screen 130 displayed by the WEB browser on the user terminal 100 when on the conversation screen 120 shown in FIG. 3, the recommendation history button 128A is selected by the user 10.

On the recommendation history display screen 130 shown in FIG. 4, a recommendation history display part 131 in which a list of commodities so far recommended as responses by the information provision system 1 to the user 10 is displayed is arranged, and on a right side thereof, a concierge image 132 is displayed. It is to be noted that in this example, the most recent 100 commodities so far recommended are displayed, and other commodities other than those shown therein can be displayed by using a scroll bar displayed on a right side in the recommendation history display part 131.

In the lowermost portion of the recommendation history display screen 130, as with the conversation screen 120, a button display part 133 is arranged, and in the button display part 133, a "Speak with a concierge" button 133A, a conversation history button 133B, and a HELP button 133C are displayed. Here, the "Speak with a concierge" button 133A is a button to shift to a mode in which a conversation with the concierge is made; and the conversation history button 133B and the HELP button 133C are the same as the conversation history button 128B and the HELP button 128C of the conversation screen 120 shown in FIG. 3, respectively.

Figure 5:
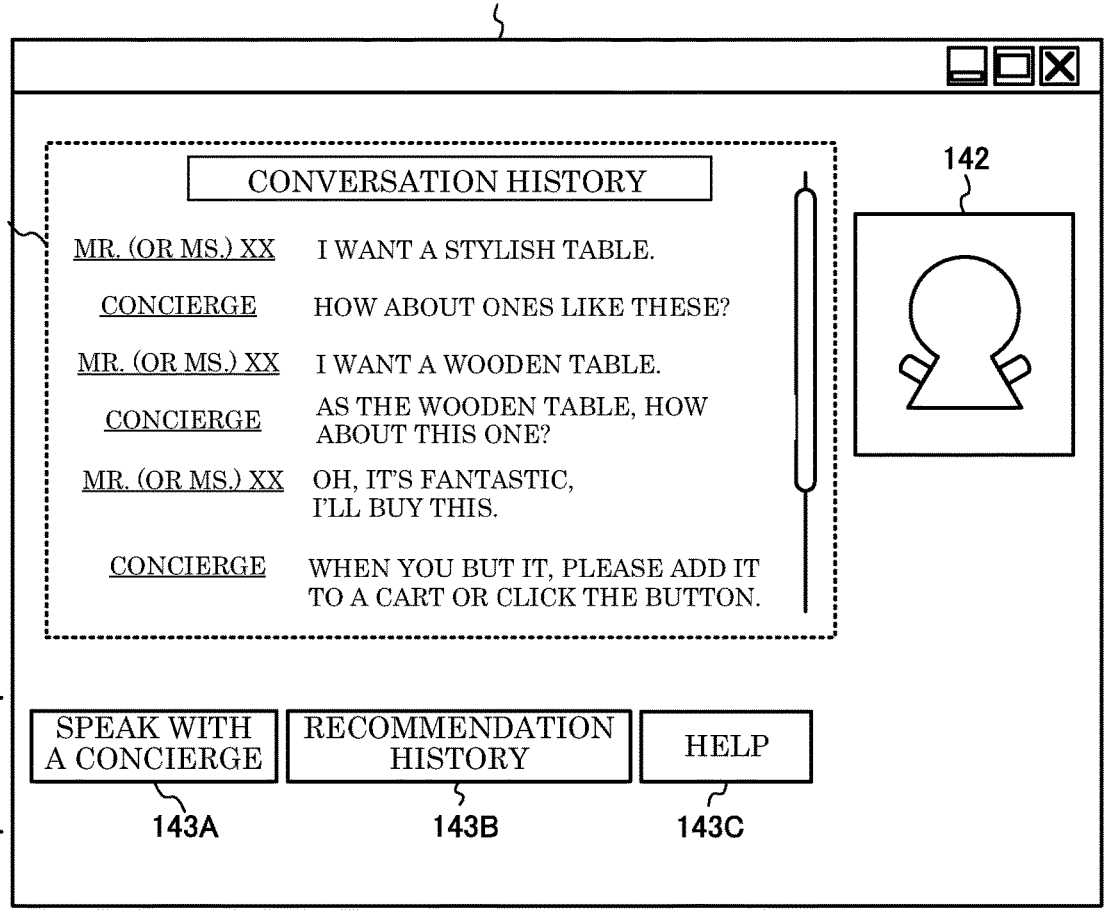
FIG. 5 is a diagram exemplifying a conversation history display screen on the Internet shopping site, according to the one embodiment of the present invention.

FIG. 5 is a diagram illustrating a conversation history display screen 140 displayed by the WEB browser on the user terminal 100 when on each of the conversation screen 120 shown in FIG. 3 and the recommendation history display screen 130 shown in FIG. 4, each of the conversation history buttons (128B and 133B) is selected by the user 10.

On the conversation history display screen 140 shown in FIG. 5, a conversation history display part 141 in which contents of responses so far displayed to the user 10 as responses from the information provision system 1 and contents inputted by the user 10 (contents shown in the conversation display part 121 of the conversation screen 120 shown in FIG. 2) are displayed as the history is arranged, and on a right side thereof, a concierge image 142 is displayed. It is to be noted that in this example, all of the history of the conversation can be displayed, and contents not displayed in the conversation history display part 141 can be browsed by using a scroll bar displayed on a right side in the conversation history display part 141.

In the lowermost portion of the conversation history display screen 140, as with the conversation screen 120 and the recommendation history display screen 130, a button display part 143 is arranged, and in the button display part 143, a "Speak with a concierge" button 143A, a recommendation history button 143B, and a HELP button 143C are displayed. The respective buttons are the same as those described with respect to the conversation screen 120 and the recommendation history display screen 130.

Figure 6:
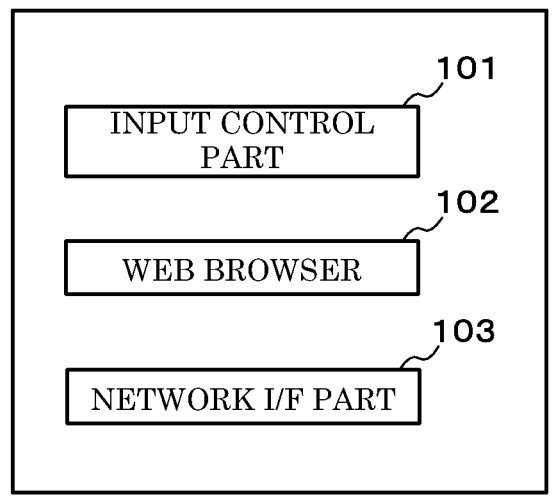
FIG. 6 is a functional block diagram showing a user terminal in the information provision system according to the one embodiment of the present invention.

Next, with reference to FIG. 6, a configuration of the user terminal 100 will be described. FIG. 6 is a functional block diagram showing the user terminal 100.

The user terminal 100 shown in FIG. 6 includes an input control part 101, a WEB browser 102, and a network I/F (interface) part 103.

When the user 10 has operated an input device such as a mouse, a keyboard, and a touch panel connected to the user terminal 100, the input control part 101 receives a signal generated by said operation as input information. The WEB browser 102 displays a specified WEB page and causes the input information received by the input control part 101 to be displayed in an input area of the WEB page. In addition, in response to the operation by the user 10 (for example, clicking or the like of the "Speak" button 125 functioning as the transmission button), an HTTP request is transmitted via the network I/F part 103 to the information provision system 1 functioning as a WEB server.

Further, upon receiving HTML data or the like including response data via the network I/F part 103 from the information provision server 200 or the like of the information provision system 1, based on the data, a WEB page is displayed (a display of the WEB browser is updated).

The network I/F part 103 is connected to the network 300 and controls data transmission and reception to and from the information provision server 200 or the like of the information provision system 1.

FIG. 7 is a functional block diagram showing the information provision server 200 in the information provision system 1.

The information provision server 200 shown in FIG. 7 includes an input reception part 201, an input analysis part 202, a response control part 203, a commodity purchase control part 204, a recommendation history and conversation history management part 205, a WEB access control part 206, and a network I/F (interface) part 207.

The response control part 203 further includes an input evaluation part 203A, a recommendation related data updating part 203B, and a response determination part 203C.

In addition, the information provision server 200 is provided with an information provision management DB 250. The information provision management DB 250 includes dictionary data 251, member information data 261, commodity data 262, user type determination data 263, preferred commodity data 264, recommendation history data 271, purchase history data 272, conversation history data 273, scenario data 281, FAQ answer collection 282, HTML data 291, and image data 292.

The input reception part 201 receives a character string inputted by the user 10 onto the user terminal 100 via the network 300 and the network I/F part 207, for example, according to a protocol such as HTTP.

The input analysis part 202 extracts key words through natural language processing using the dictionary data 251 (for example, key word extraction by a morphological analysis or the like is conducted).

The input evaluation part 203A of the response control part 203 stores a conversation constituted of inputs from the user 10 and responses by the information provision system 1 and conducts conversion and supplementation of the extracted key words as needed.

The recommendation related data updating part 203B of the response control part 203 determines a user type of the user 10 and updates as needed user attribute data used when the response determination part 203C determines recommended commodities for the user 10.

The response determination part 203C of the response control part 203 determines recommended commodities and determines a response sentence and information provided for the user 10 in the form of responses from the concierge based on a responding policy.

When the user 10 purchases a commodity, the commodity purchase control part 204 controls a procedure of purchasing and guiding of a procedure of purchasing by the response determination part 203C by using the scenario data 281 or the like. In addition, the commodity purchase control part 204 stores the commodity purchased by the user 10 in the purchase history data 272.

The recommendation history and conversation history management part 205 stores recommended commodities determined by the response determination part 203C in the recommendation history data 271 and stores contents of the conversation by the user 10 and the concierge in the conversation history data 273. In addition, as shown in FIG. 4, in response to the operation by the user 10, the recommendation history and conversation history management part 205 performs control so as to display recommended commodity information stored in the recommendation history data 271 on the recommendation history display screen 130 and as shown in FIG. 5, in response to the operation by the user 10, to display conversation information stored in the conversation history data 273 on the conversation history display screen 140.

When an HTTP request is transmitted from the WEB browser on the user terminal 100 in response to the operation by the user 10, the WEB access control part 206 receives and analyzes this HTTP request, prepares data corresponding thereto, and sends a reply as an HTTP response to the WEB browser on the user terminal 100. The data sent as the HTTP response includes HTML data for, for example, displaying a recommended commodity, generated by the response determination part 203C of the response control part 203, and in addition thereto, HTML data generated for causing the recommendation history and conversation history management part 205 to display the recommendation history display screen 130 and the conversation history display screen 140. In addition, the data sent as the HTTP response also includes the HTML data 291 and the image data 292 in the information provision management DB 250. The HTML data 291 is HTML data for displaying a WEB page and the image data 292 is image data and moving image data displayed in the WEB page.

The network I/F (interface) part 207 is connected to the network 300 and controls data transmission and reception to and from the user terminal 100 or the like.

It is to be noted that although in the present specification, it is described that the variety of pieces of data including the member information data 261 and the like are stored in the information provision management DB 250, said variety of pieces of data can be stored as data having a variety of structures and formats including a table of a relational database and a flat file.

In addition, the information provision server 200 can also be configured such that the information provision server 200 itself does not have at least one part of the data, which is shown as being stored in the information provision management DB 250 in FIG. 7 (for example, the commodity data 262, the scenario data 281, and the like), and obtains these pieces of data externally (for example, from an external server connected via a network such as the Internet) by using predetermined commands.

Figure 8:
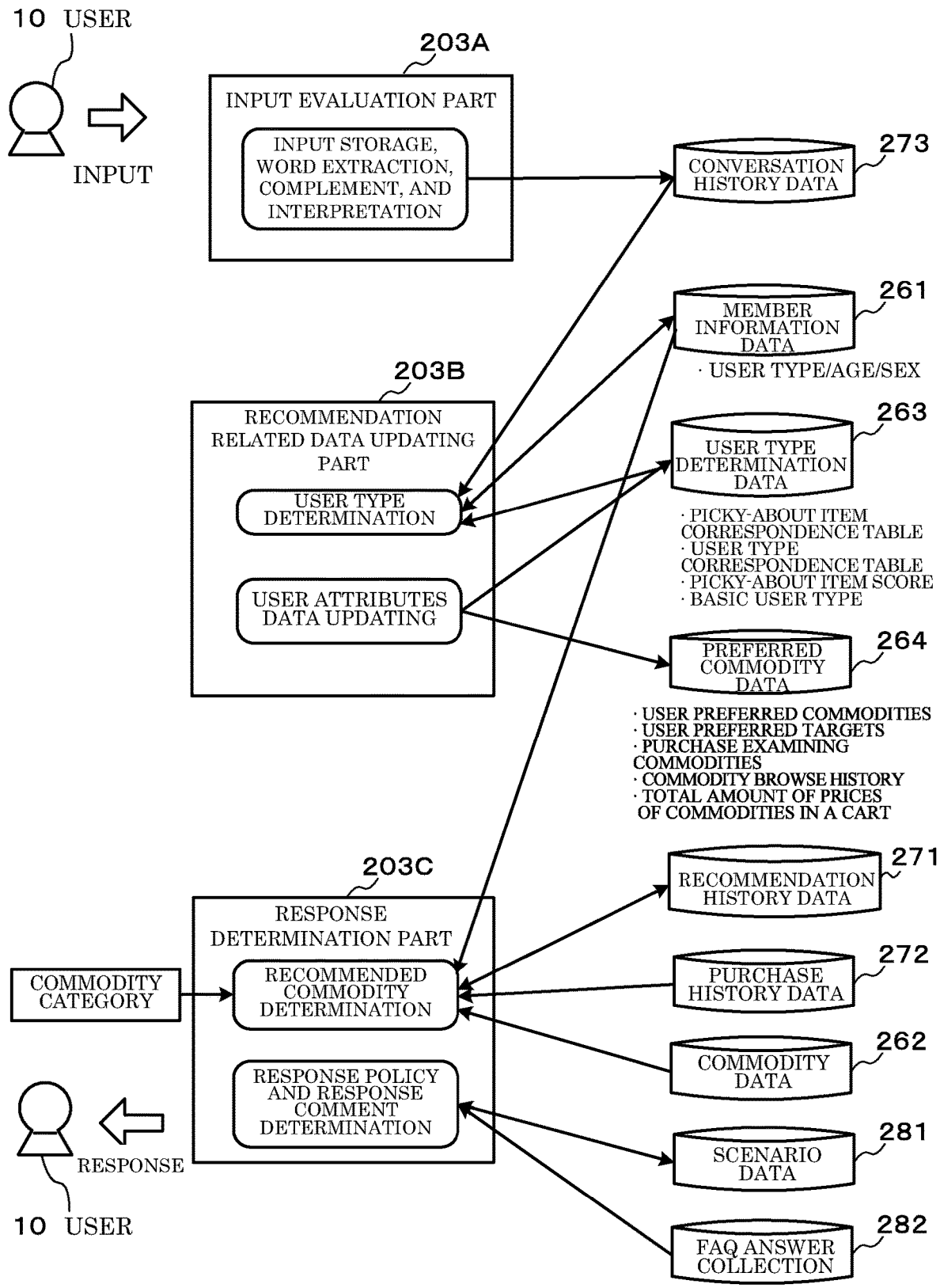
FIG. 8 is a diagram for explaining in details functions of one part of the information provision server in the information provision system according to the one embodiment of the present invention.

FIG. 8 is a diagram for explaining the functions of one part of the information provision server 200 in a further detailed manner. In FIG. 8, the respective function parts of the response control part 203 shown in FIG. 7 (namely, the input evaluation part 203A, the recommendation related data updating part 203B, and the response determination part 203C) in the information provision server 200 are shown.

The input evaluation part 203A stores a conversation constituted of inputs from the user 10 and responses by the information provision system 1 in the conversation history data 273. Further, the input evaluation part 203A converts, or complements, the extracted key word to a word which is easily hit upon searching, interprets said key word, and converts, or complements, said key word to be in the form so as to allow the information provision system 1 to easily handle said key word (for example, in the form in which the information provision system 1 easily utilizes the scenario data 281 and the like).

The recommendation related data updating part 203B determines a user type of the user 10 based on the received utterance of the user 10 and data obtained from the member information data 261. Contents of the utterance of the user 10 can be obtained from the conversation history data 273 and can also be obtained via the input reception part 201 from the user terminal 100 at near-real-time timing. In addition, upon determining the user type, a key word and picky-about item correspondence table (refer to FIG. 12) and a user type correspondence table (refer to FIG. 13) which are stored in the user type determination data 263 are referenced.

In addition, with reference to a variety of pieces of data including picky-about item scores and basic user types stored in the user type determination data 263, the preferred commodity data 264, the recommendation history data 271, the purchase history data 272, and the like, a user type can be determined. The determined user type of the user 10 is stored in the member information data 261 so as to be associated with said user 10.

In addition, the recommendation related data updating part 203B stores and updates a variety of pieces of user attribute data as needed. For example, the recommendation related data updating part 203B stores picky-about item scores related to each user 10 as user type determination data 263. Further, the recommendation related data updating part 203B stores data of user preferred commodities, user preference targets, purchase examining commodities, a commodity browse history, and the like related to each user 10 as preferred commodity data 264. The user attribute data stored in this way, as described above, is used when the response determination part 203C determines a recommended commodity for a user 10.

The response determination part 203C obtains a user type of the user 10 from the member information data 261, obtains information pertinent to purchased commodities related to a user whose user type is the same as the user type of the user 10 from the purchase history data 272, and based on these pieces of information, determines a recommended commodity to be presented to the user 10 from among commodities stored in the commodity data 262. The determined recommended commodity is stored in the recommendation history data 271.

In addition, upon determining a recommended commodity, the response determination part 203C can determine a commodity appropriate for the user 10 by utilizing the conversation history data 273, the preferred commodity data 264, the recommendation history data 271, and the like. In addition, based on purchased commodities, purchase examining commodities, browsed commodities, and the like related to not only the user whose user type is the same as the user type of the user 10 but also a user of a user type similar thereto, recommended commodities can be determined.

Further, with reference to the scenario data 281 and the like, the response determination part 203C determines a responding policy for the user 10 and determines contents of a response to the user 10 based on data such as the scenario data 281 and the FAQ answer collection. In addition, with reference to a variety of pieces of data such as the conversation history data 273, the member information data 261, the recommendation history data 271, the purchase history data 272, and the commodity data 262, based on these pieces of data, the response determination part 203C can determine the contents of a response. In the scenario data 281, response patterns corresponding to input patterns of the user 10 are defined, and based on these response patterns, the responding policy and the contents of a response are determined. The scenario data 281 includes knowledge data, and said knowledge data can be configured to be updated by learning through the conversation with the user 10.

By the above-described response determination part 203C, the information provision system 1 not merely receives an input from the user 10 and returns a passive response in accordance with the contents thereof but also can output, to the user terminal 100, as a response an active question which draws out additional key words and information from the user 10 in order to determine recommended commodities and the like in a more specific manner with high precision.

In addition, a scenario is configured such that users are purposefully guided to surplus inventory commodities in the information provision system 1 and commodities whose profitability ratios are high, thereby allowing said commodities to be presented as recommended commodities in a conversation with the user 10.

It is to be noted that although in FIG. 8, accesses of the respective function parts which are the input evaluation part 203A and the others with the variety of pieces of data are indicated by arrows, these merely indicate accesses related to representative processes of the respective function parts, and the present invention is not limited thereto.

FIG. 9 is a diagram showing an example of the member information data 261 included in the information provision management DB 250 utilized by the information provision server 200 or the like in the information provision system 1.

As shown in FIG. 9, in the member information data 261, for example, a user ID, a password, a user type, a name, sex, an occupation, age, the date of birth, an habitation area, marriage, hobbies, interesting categories, uninteresting categories, events of personal interest, a purchase history, a purchase price, a number of times of visiting, a degree of satisfaction, and the like are stored.

Among these items, the user ID, the user type, the purchase history, the purchase price, the number of times of visiting, and the degree of satisfaction are system setting items which are automatically set and updated by the information provision system 1, and the other items are user registration items which are registered when the user 10 makes membership registration.

The user ID is an ID which is automatically numbered by the information provision system 1 when the user 10 initially makes the membership registration. The password is inputted by the user 10 upon logging-in and is set by the user 10 when the user 10 initially makes the membership registration.

The information provision system 1 classifies respective users as user types based on contents of conversations of the users 10, member information such as sex and age, and the like. The user type is data (for example, "A", "C", and the like) indicating a user type determined for each of the respective users as belonging thereto. The determination of the above-mentioned user types will be described later in details.

The name is a name of himself or herself which is set by the user 10 and may be a nickname or the like. The sex, the occupation, the age, the date of birth, the habitation area, the marriage, the hobbies, the interesting categories, the uninteresting categories, and the events of personal interest are selected from choices shown in the information provision system 1 to be set when the user 10 initially makes the membership registration or the like.

In the purchase history, based on the purchase history data 272 in which the commodities so far purchased by the user 10 are recorded, for example, the commodities purchased last time, categories of often purchased commodities, and the like are set. In the purchase price, based on the above-mentioned purchase history data 272, for example, an average price of purchased commodities, a total amount of prices of purchased commodities, and the like are set.

In the number of times of visiting, based on the conversation history data 273 in which a history of the conversation which the user 10 has so far had with the information provision system 1 is recorded, for example, data for distinguishing between a frequency of five to nine times and a frequency of ten times or more is set. In the degree of satisfaction, for example, a number of times at which the Thanks button 128D displayed on the conversation screen 120 shown in FIG. 3 is clicked is counted, and the counted number is set.

FIG. 10 is a diagram showing an example of the commodity data 262 included in the information provision management DB 250 utilized by the information provision server 200 or the like in the information provision system 1.

As shown in FIG. 10, in the commodity data 262, for example, a commodity ID, a commodity name, a maker name, a commodity category, detailed information, recommendation information, discount information, customer information, new model information, economy-size model information, and the like are stored.

In the commodity category, categories classified by a plurality of criteria can be included. For example, the commodity category can be configured so as to include commodity categories by basic classification based on commodity classification and by-purpose categories by classification based on purposes of using commodities.

The detailed information is, for example, information pertinent to content quantities, ingredients, explanation about commodities, and the like. The recommendation information includes words of recommending said products, seasonal recommendation messages, and the like, which can also be prepared by each maker and each Internet shop. The discount information is information pertinent to discount and campaigns, which an Internet shop prepares and adds. The discount information may be associated with a plurality of commodity groups, a predetermined category, and other classification, instead of each commodity.

In the customer information, for example, customers' comments and purchasers' use feeling are stored for each commodity. In the new model information, for example, new models of commodities and information pertinent to the new models are stored. In the economy-size model, for example, commodity IDs of economy-size commodity models, which are commodities with larger economy sizes, are stored.

Figure 11:
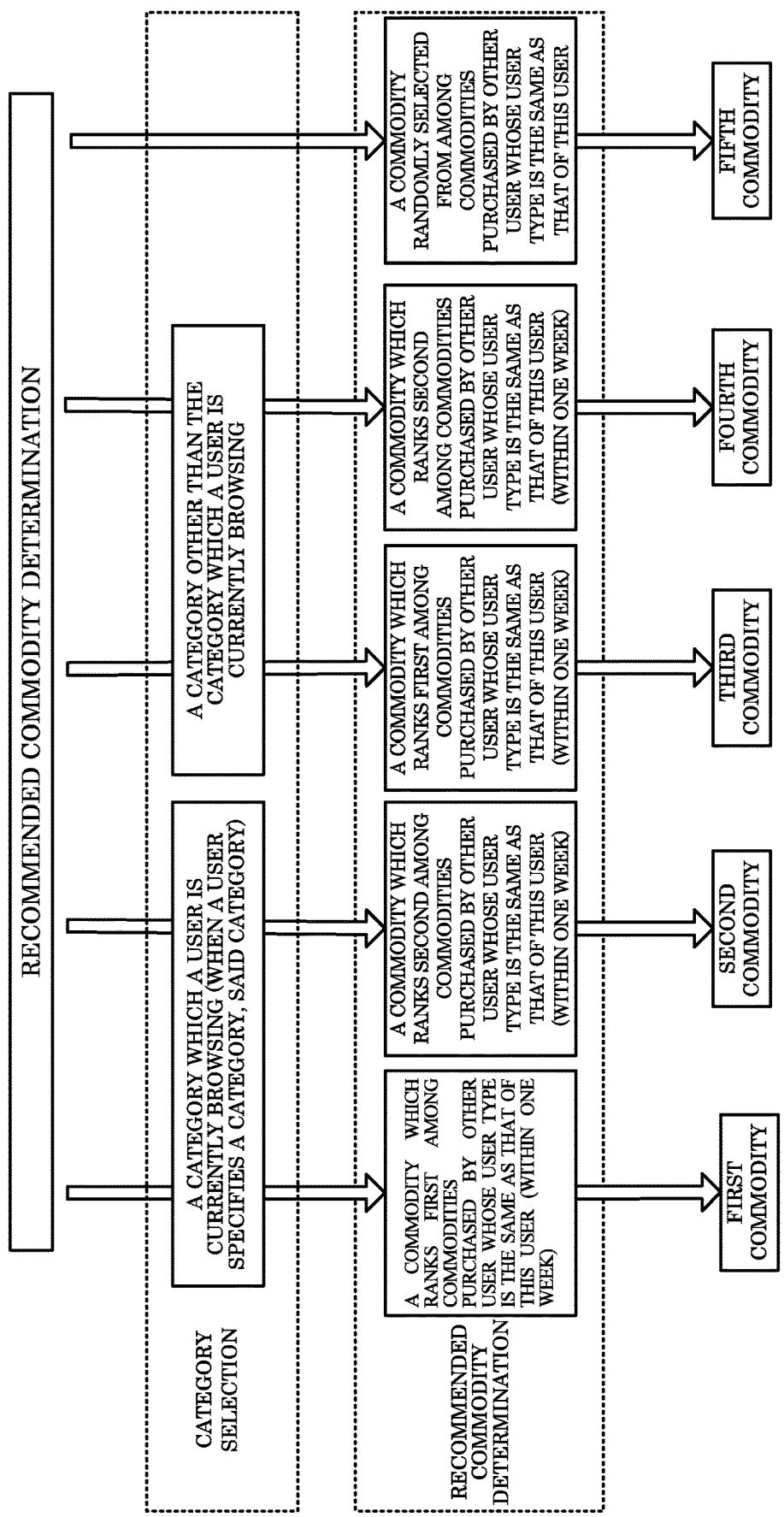
FIG. 11 is a diagram conceptually showing a method of determining recommended commodities in the information provision system according to the one embodiment of the present invention.

Next, FIG. 11 is a diagram conceptually showing how in the information provision system 1 according to the present embodiment, recommended commodities to be presented to the user 10 are determined. The presentation of the recommended commodities to the user 10 by the information provision system 1 is conducted, for example, in a case where when "Mr. (or Ms.) XX" who is the user 10 inputs (utters) "I want a stylish table." in the conversation display part 121 of the conversation screen 120 shown in FIG. 3, a "concierge" who is an agent of the information provision system 1 responds, saying "How about ones like these?" and concurrently displays the recommended commodities in the commodity display part 126.

In FIG. 11, when the recommended commodities are determined, a category of commodities is first selected and thereafter, the recommended commodities are selected from among commodities purchased by a user whose user type is the same as the user type of the user 10 who has uttered based on predetermined criteria.

For example, a first recommended commodity is a commodity belonging to a category which the user 10 is currently browsing in a WEB page and is determined by identifying a commodity which ranks first among commodities purchased by the other user whose user type is the same as the user type of this user 10. It is to be noted that as in the conversation display part 121 of the conversation screen 120 shown in FIG. 3, when a specific commodity category (in this example, the "table") is cited, based on the cited content of the utterance, commodities are searched from the commodity category (table). In addition, in this example, the ranking shows a ranking within the most recent one week.

A second recommended commodity is a commodity belonging to the category which the user 10 is currently browsing in the WEB page and is determined by identifying a commodity which ranks second among the commodities purchased by the other user whose user type is the same as the user type of this user 10.

A third recommended commodity is a commodity not belonging to the category (daringly) which the user 10 is currently browsing in the WEB page and is determined by identifying a commodity which ranks first among commodities purchased by the other user whose user type is the same as the user type of this user 10.

A fourth recommended commodity is a commodity not belonging to the category (daringly) which the user 10 is currently browsing in the WEB page and is determined by identifying a commodity which ranks second among the commodities purchased by the other user whose user type is the same as the user type this user 10.

A fifth recommended commodity is determined without identifying a category particularly and by randomly selecting one from among commodities purchased by the other user whose user type is the same as the user type of this user 10.

As described above, in the information provision system 1 according to the present embodiment, based on the purchase information related to other user whose user type is the same as the user type of the user 10 (for example, information pertinent to what commodities the user 10 is interested in), recommended commodities can be determined. As the purchase information, information pertinent to commodities actually purchased by other user (including hot-selling ranking or the like) is included. In addition, information pertinent to behavior of other user before purchasing such as information pertinent to commodities browsed in a WEB page and information pertinent to commodities which are examined for the purchase in the conversation with the information provision system 1 is also included as the purchase information.

Next, with reference to FIG. 12 to FIG. 15, a first pattern of user type management in the information provision system 1 according to the present embodiment will be described.

FIG. 12 is a correspondence table (key word and picky-about item correspondence table) in which key words and picky-about items are associated with each other. Utterance of the user 10 inputted to the information provision system 1 is subjected to natural language processing using the dictionary data 251 or the like, and key words related to determination of a user type as shown in the key word and picky-about item correspondence table in FIG. 12 are extracted. In the key word and picky-about item correspondence table in FIG. 12, key words are considered to show preference of a user, respective key words and kinds of pickiness related thereto are set. It is to be noted that in the present specification, the key words embrace concept such as phrases and sentences including a plurality of words.

For example, when the user 10 utters key words, "marine-taste", "adorable", and "it is cool" in a conversation with the concierge, the user 10 is evaluated as being picky about a design, and said user is associated with a picky-about item of a "design" (NO. 1).

In addition, when the user 10 utters key words, "ecological", "quick", and "excellent effect" in a conversation with the concierge, the user 10 is evaluated as being picky about functionality, effect, and efficacy, and said user is associated with a picky-about item of "functionality, effect, and efficacy" (NO. 2).

Hereinafter, similarly as shown in the key word and picky-about item correspondence table in FIG. 12, said user 10 is associated with picky-about items of NO. 1 to NO. 10.

FIG. 13 is a user type correspondence table showing association of user types (here, A to X) based on picky-about item NOs (picky-about items NO. 1 to NO. 10 in FIG. 12 shown above), sex, and age.

For example, when a user 10 whose picky-about item is evaluated to be a picky-about item NO. 1 (design) with reference to the key word and picky-about item correspondence table in FIG. 12 is a male in his 10's, a user type of the user 10 is determined to be "G". A user of the user type "G" is a user who has, as attributes, great pickiness about a design, feeling, and taste (in setting in this example).

In addition, when a user 10 whose picky-about item is evaluated to be a picky-about item NO. 2 (functionality, effect, and efficacy) with reference to the key word and picky-about item correspondence table in FIG. 12 is a female in her 30's, a user type of the user 10 is determined to be "E". A user of the user type "E" is a user who has, as attributes, great pickiness about functionality, effect, efficacy, usability, and quality (in setting in this example).

Hereinafter, similarly, based on the picky-about items evaluated with reference to the key word and picky-about item correspondence table in FIG. 12, sex, and age, user types are determined with reference to the user type correspondence table in FIG. 13.

Figure 14:
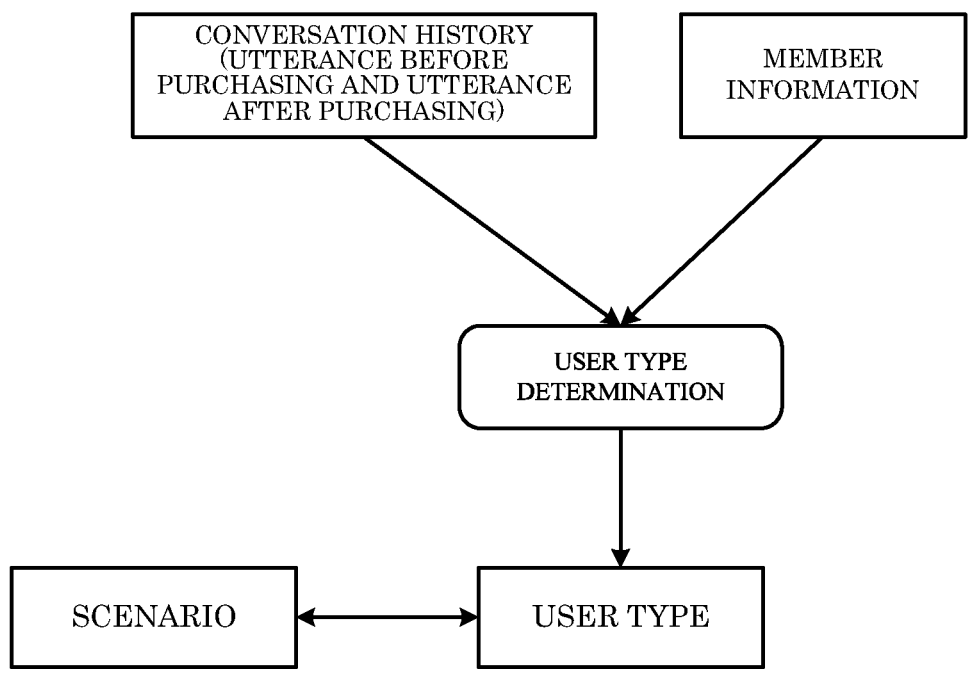
FIG. 14 is a diagram conceptually showing a method of determining a user type in the first pattern of the user type management in the information provision system according to the one embodiment of the present invention.

FIG. 14 is a diagram conceptually showing how the user type is determined with respect to each user 10 in the information provision system 1 according to the present embodiment. As shown in FIG. 14, based on data inputted by that user 10 to the user terminal 100 (for example, utterance of the user 10 included in the conversation history data 273, which includes utterance before purchasing a commodity and utterance after purchasing the commodity) and member information (for example, data pertinent to sex and age included in the member information data 261), a user type of the user 10 is determined (refer to the user type correspondence table shown in FIG. 13).

In addition, as shown in FIG. 14, based on the user type determined as described above, a scenario with respect to the utterance of the user 10 is searched, and in accordance with the scenario, a response is generated.

In addition, since the user type of a user 10 shows attributes of a user, a plurality of user types can also be set for each user 10. In addition, since the utterance of the user 10 is accumulated each time the user 10 accesses the information provision system 1, such contents of the utterance are extracted at predetermined timing and a user type or user types can also be thereby re-examined.

Figure 15:
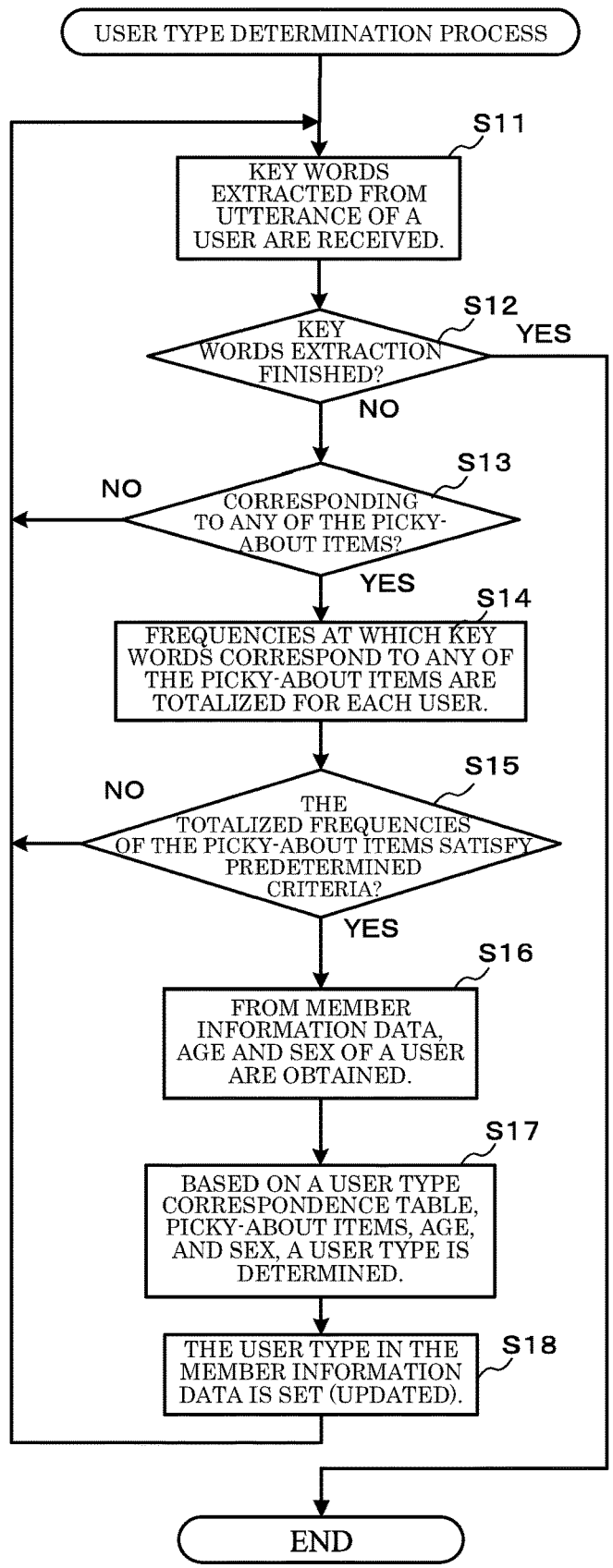
FIG. 15 is a flowchart for explaining a processing procedure for determining a user type in the first pattern of the user type management in the information provision system according to the one embodiment of the present invention.

FIG. 15 is a flowchart for explaining a processing procedure for determining a user type from the utterance of the user 10 based on the key word and picky-about item correspondence table shown in FIG. 12 and the user type correspondence table shown in FIG. 13. The processing shown in FIG. 15 is called up, for example, each time the user 10 utters.

First, at step S11, the information provision server 200 of the information provision system 1 receives an input (utterance) of the user 10 from the user terminal 100 and through the natural language processing or the like using the dictionary data 251 or the like, extracts key words from the input. Next, at step S12, it is determined whether or not key words to be extracted are present. When the key words are not present (NO at step S12), the processing is finished.

When the key words are present (YES at step S12), at step S13, it is determined whether or not the extracted key words correspond to any of the picky-about items (that is, it is determined whether or not any picky-about item corresponding to any of key words is present with reference to the key word and picky-about item correspondence table in FIG. 12). When the extracted key words do not correspond to any of the picky-about items (NO at step S13), the processing returns to step S11 and processing for the next key words is conducted.

When the extracted key words correspond to any of the picky-about items (YES at step S13), at step S14, frequencies at which key words correspond any of the picky-about items are totalized for each user. The totalized frequencies of the picky-about items are stored, for example, as the user type determination data 263.

Thereafter, at step S15, it is determined whether or not the totalized frequencies of the picky-about items satisfy predetermined criteria. When the predetermined criteria are not satisfied (NO at step S15), the processing returns to step S11 and processing for the next key words is conducted. When the predetermined criteria are satisfied (YES at step S15), at step S16, with reference to the member information data 261, age and sex of the corresponding user 10 are obtained.

Next, at step S17, with reference to the user type correspondence table (the user type correspondence table shown in FIG. 13), based on a combination of the picky-about items determined as satisfying the predetermined criteria and the age and sex of the user obtained at step S16, a user type is obtained and determined as the user type of the user 10.

Thereafter, at step S18, the determined user type is set as the corresponding user type of the user 10 in the member information data 261 (updated in a case where the determined user type has already been set).

It is to be noted that although in this example, when the user 10 utters the key words corresponding to the picky-about items several times, it is determined that the predetermined criteria are satisfied, and these picky-about items are set as the picky-about items of the user 10, by employing a method other than this, based on the utterance of the user 10, picky-about items of the user 10 may be determined.

Next, with reference to FIG. 16 and FIG. 17, a method of determining recommended commodities in the information provision system 1 according to the present embodiment will be described.

Figure 16:
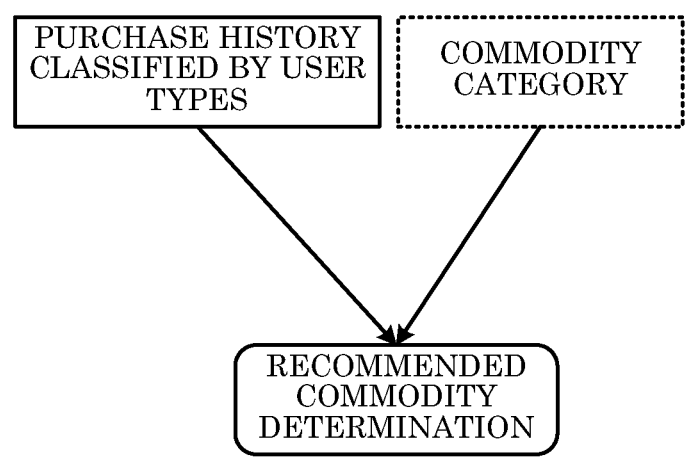
FIG. 16 is a diagram conceptually showing a method of determining recommended commodities in the first pattern of the user type management in the information provision system according to the one embodiment of the present invention.
Figure 17:
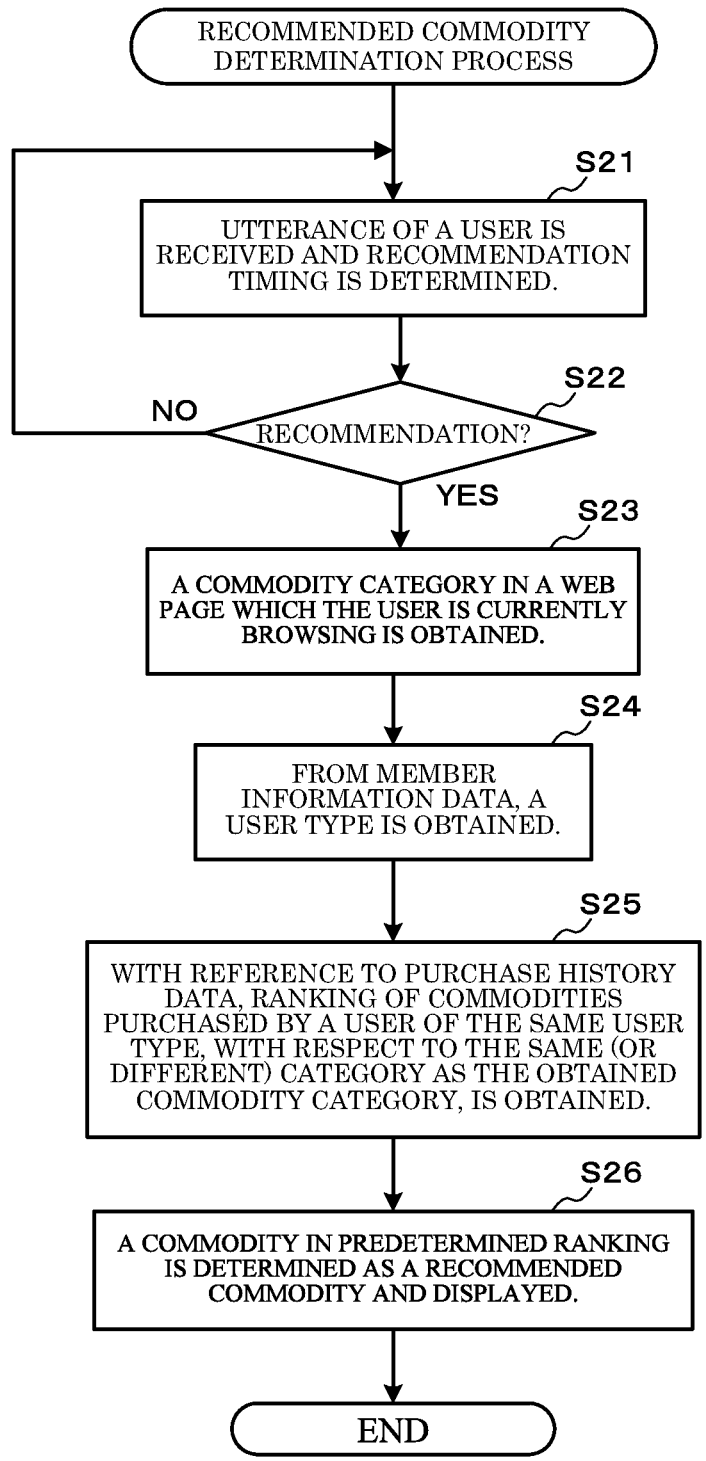
FIG. 17 is a flowchart for explaining a processing procedure for determining recommended commodities in the first pattern of the user type management in the information provision system according to the one embodiment of the present invention.

FIG. 16 is a diagram conceptually showing how the recommended commodities are determined. As shown in FIG. 16, in this example, based on criteria related to commodity categories and criteria related to commodities purchased by other user whose user type is the same as the user type of the user 10, or only based on the criteria related to the commodities purchased by the other user whose user type is the same as the user type of the user 10, recommended commodities are determined and presented to the user 10. It is to be noted that in this example, the commodity category is the commodity category which the user 10 is displaying on a WEB page.

In addition, for the determination of the above-described recommended commodities, other criteria related to commodity categories can also be used and other criteria related to commodities purchased by other user whose user type is the same as the user type of the user 10 can also be used. Further, for the determination of the recommended commodities, criteria other than the criteria related to the commodity categories and other than the criteria related to the commodities purchased by the other user whose user type is the same as the user type of the user 10 can also be used.

Further, in this example, the recommended commodities are determined based on the purchase information of other user whose user type is the same as the user type of the user 10. However, based on purchase information related to other user whose user type is similar to the user type of the user 10 and purchase information related to other user who is considered, from a predetermined viewpoint, to belong to the same classification as classification to which the user 10 belongs, recommended commodities can be determined. For example, as in the user type correspondence table shown in FIG. 13, user types A, B, C, D, E, and F can be considered to belong to the same classification in that users of these user types have common attributes. In addition, user types G, H, and I can be considered to belong to the same classification in that the sex thereof is the same as one another and users of these user types have common attributes.

Next, with reference to a flowchart in FIG. 17, based on a user type of the user 10 determined in the processing procedure shown in the flowchart in FIG. 15, a processing procedure for determining recommended commodity for the user 10 will be described. It is to be noted that in this example, a pattern in which based on a commodity category which the user 10 is browsing and a user type, recommended commodity are determined will be described.

First, at step S21, utterance of the user 10 is received, and from the utterance, recommendation timing is determined. In this processing, for example, from the utterance of the user 10, key words are extracted through natural language processing or the like using the dictionary data 251 or the like, and from the extracted key words and the scenario data 281 or the like, the recommendation timing at which recommended commodities are presented to the user 10 is determined. Next, at step S22, it is determined whether or not the present time is recommendation timing, and when the present time is not the recommendation timing (NO at step S22), the processing returns to step S21 and utterance of the user 10 is received.

When the present time is the recommendation timing (YES at step S22), at step S23, a commodity category in a WEB page which the user 10 is currently browsing is obtained. Next, at step S24, from the member information data 261, a user type is obtained. Here, since the user 10 has logged in by using a user ID upon browsing the WEB page for Internet shopping, the current user 10 can be identified therefrom and the user type corresponding thereto can be obtained from the member information data 261.

Next, at step S25, with reference to the purchase history data 272, ranking of commodities purchased by the user of the same user type, with respect to the same (or different) category as the obtained commodity category, is obtained. Here, when the purchase history data 272 has only the purchase history recorded therein, all of the related purchase history is obtained, and from that history, ranking data is generated.

Thereafter, at step S26, a commodity in predetermined ranking (for example, in the commodity category currently being browsed, a commodity which ranks first among commodities purchased by a user who user type is the same as the user type of the user 10) is determined as a recommended commodity, and HTML data for presenting the determined recommended commodity to the user 10 is generated.

Next, with reference to FIG. 18 to FIG. 20, a second pattern in the user type management in the information provision system 1 according to the present embodiment will be described.

In the second pattern, as shown in FIG. 18, three basic user types (TYPE-1, TYPE-2, and TYPE-3) are prepared, and with respect to each of the basic user types, degrees of picky-about items are defined from three viewpoints.

For example, with respect to the TYPE-1, degrees of picky-about items are defined such that a degree of being picky about a product is low (a score: 20 to 40), a degree of being picky about a price is high (a score: 75 to 95), and a degree of accepting recommendation (in other words, a user of the TYPE-1 is in need of the presentation of recommended commodities provided from the information provision system 1 and has a stance in which the user accepts said presentation) is high (a score: 75 to 95).

In addition, with respect to the TYPE-2, degrees of picky-about items are defined such that a degree of being picky about a product is very high (a score: 80 to 100), a degree of being picky about a price is very high (a score: 80 to 100), and a degree of accepting recommendation is low (a score: 0 to 10). Further, with respect to the TYPE-3, degrees of picky-about items are defined such that a degree of being picky about a product is slightly low (a score: 30 to 50), a degree of being picky about a price is medium (a score: 40 to 60), and a degree of accepting recommendation is slightly high (a score: 50 to 60).

Figure 19:
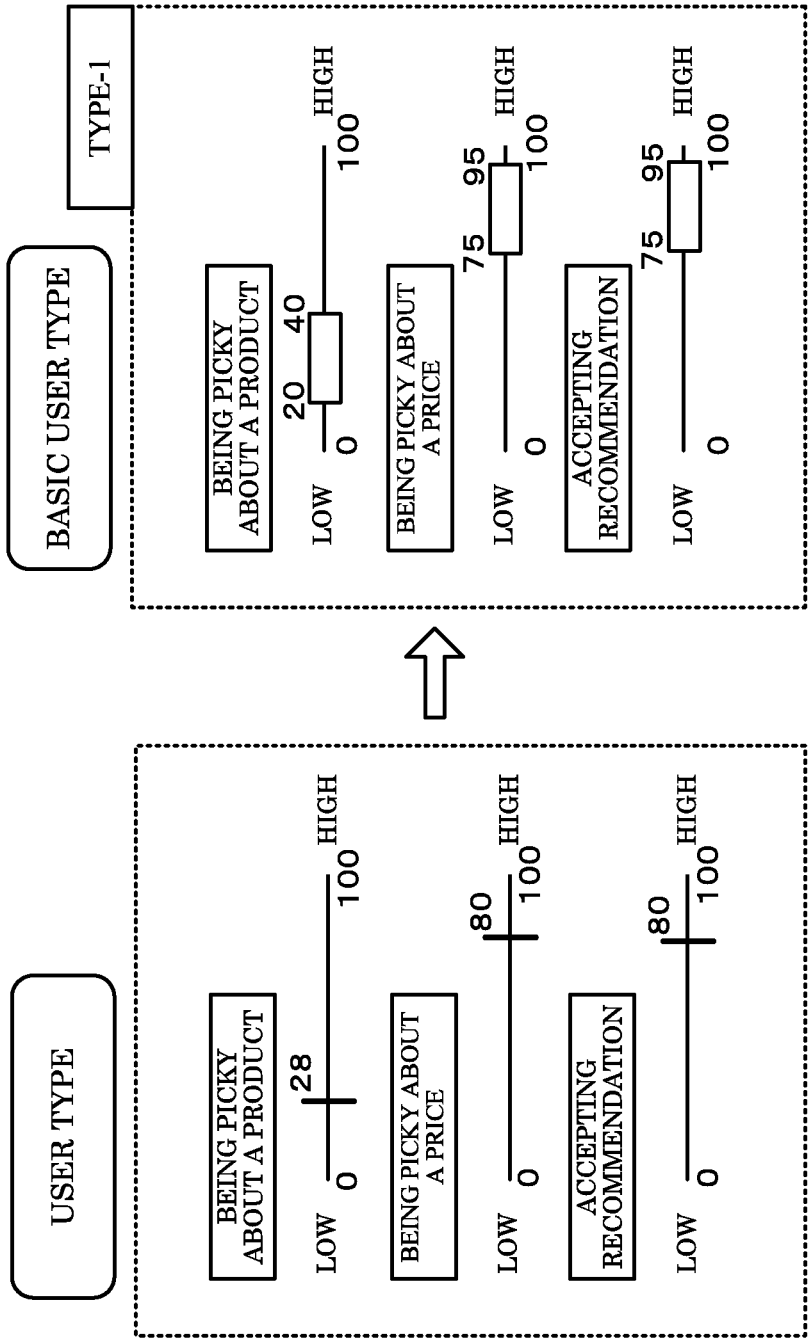
FIG. 19 is a diagram showing an example of applying a user to one of basic user types in the second pattern of the user type management in the information provision system according to the one embodiment of the present invention.

On a left side of FIG. 19, with respect to an individual user type of the user 10, scores of picky-about items from the three viewpoints (that is, the pickiness about a product, the pickiness about a price, and the pickiness about recommendation) are shown. These scores of the picky-about items are adjusted by performing addition and subtraction based on key words extracted from utterance of the user 10. Each of these scores takes a value of 0 to 100. For example, each time the user 10 utters key words indicating that a degree of being picky about a product is low, subtraction from the score related to the degree of being picky about a product as the picky-about item is performed, and in this example, a value of the score is adjusted to be 28. Similarly, the score related to a degree of being picky about a price is adjusted to be 80 and the score related to a degree of accepting recommendation is adjusted to be 80, respectively.

On a right side of FIG. 19, with respect to the basic user type "TYPE-1" shown in FIG. 18, under which the individual user type of the user 10 shown on the left side of FIG. 19 falls and which is determined as the user type "TYPE-1" among the basic user types, ranges of scores thereof are shown. Specifically, with respect to the individual user type shown on the left side of FIG. 19, the score related to the degree of being picky about a product is 28 and falls in a range of 20 to 40 of the score related to the degree of being picky about a product with respect to the basic user type "TYPE-1" shown on the right side thereof. In addition, with respect to the individual user type shown on the left side of FIG. 19, the score related to the degree of being picky about a price is 80 and falls in a range of 75 to 95 of the score related to the degree of being picky about a price with respect to the basic user type "TYPE-1" shown on the right side thereof. Similarly, with respect to the individual user type shown on the left side of FIG. 19, the score related to the degree of accepting recommendation is 80 and falls in a range of 75 to 95 of the score related to the degree of accepting recommendation with respect to the basic user type "TYPE-1" shown on the right side thereof. Of course, since each time the user 10 utters, the scores related to the picky-about items of the individual user type change, a corresponding basic user type is likely to change over time.

Figure 20:
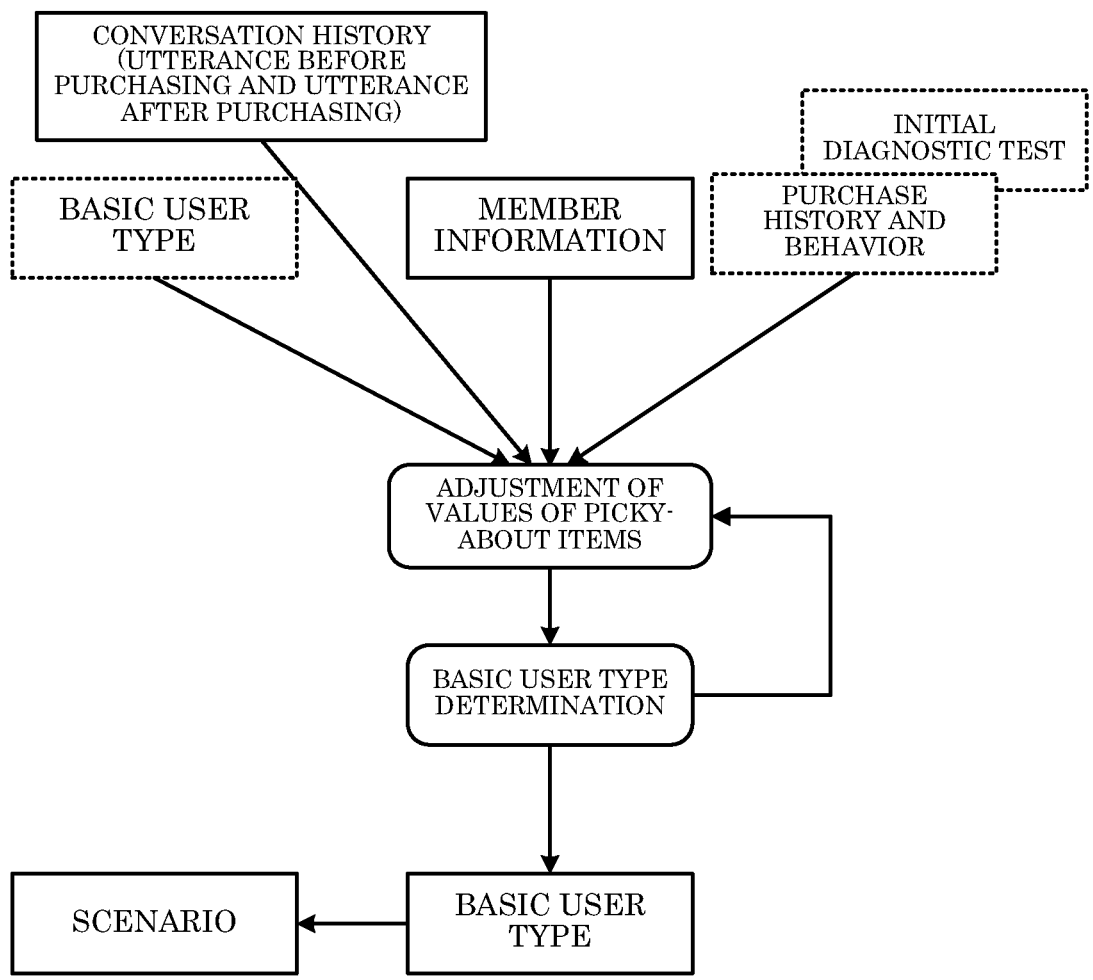
FIG. 20 is a diagram conceptually showing a method of determining a user type in the second pattern of the user type management in the information provision system according to the one embodiment of the present invention.

FIG. 20 is a diagram conceptually showing how each of the user types related to the user 10 is determined in the above-described second pattern. As shown in FIG. 20, based on data inputted by the user 10 onto the user terminal 100 (for example, utterance by the user 10 included in the conversation history data 273, including utterance before purchasing a commodity and utterance after purchasing the commodity), the member information, and the like, scores of the respective picky-about items of the user type of the user 10 are adjusted.

In addition, also based on a result of an initial diagnostic test conducted for the user 1, the purchase history stored in the purchase history data 272, behavior related to the purchase, and the like, the scores can be adjusted. In addition, as initial values of a user type, scores of a predetermined basic user type can also be used.

For a predetermined period of time, the scores are adjusted as described above, and based on the adjusted scores, a basic user type which falls under any one among the user types is determined and is determined as the user type of the user 10.

In addition, as shown in FIG. 20, based on the basic user type determined as described above, a scenario with respect to the utterance by the user 10 is searched, and in accordance with the scenario, a response is generated.

In addition, since each time the user 10 accesses the information provision system 1, the user 10 utters and the utterance is accumulated, such contents of the utterance are extracted at predetermined timing, and the user type can also be thereby re-examined.

It is to be noted that although in this example, based on the member information, the user type is determined, the user type can also be determined without using the member information.

Next, with reference to FIG. 21 to FIG. 23, a third pattern of the user type management in the information provision system 1 according to the present embodiment will be described.

As shown in FIG. 21, in the third pattern, in accordance with degrees of picky-about items from two viewpoints, nine user types are set. One of the picky-about items is a product and the other thereof is a price. Each of the picky-about items is evaluated at four levels: "having pickiness", "having moderate pickiness", "having little or no pickiness", and "having no pickiness". In accordance with these combinations, nine user types are defined, and further, these plurality of user types are classified into several groups.

For example, as shown in FIG. 21, a user type having pickiness about a product and having little or no pickiness about a price (type A), a user type having pickiness about a product and also having pickiness about a price (type C), and a user type having pickiness about a price and having little or no pickiness about a product (type I) are classified as a "picky group".

In addition, a user type having pickiness about a product and having moderate pickiness about a price (type B) and a user type having pickiness about a price and having moderate pickiness about a product (type F) are classified as a "partially picky group".

In addition, a user type having no pickiness about a price and having moderate pickiness about a product (type D) and a user type having no pickiness about a product and having moderate pickiness about a price (type H) are classified as a "slightly picky group".

In addition, a user type having moderate pickiness about a product and having moderate pickiness about a price (type E) is classified as a "normally picky group". A user type having no pickiness about a product and having no pickiness about a price (type G) is classified as a "non-picky group".

Figure 22:
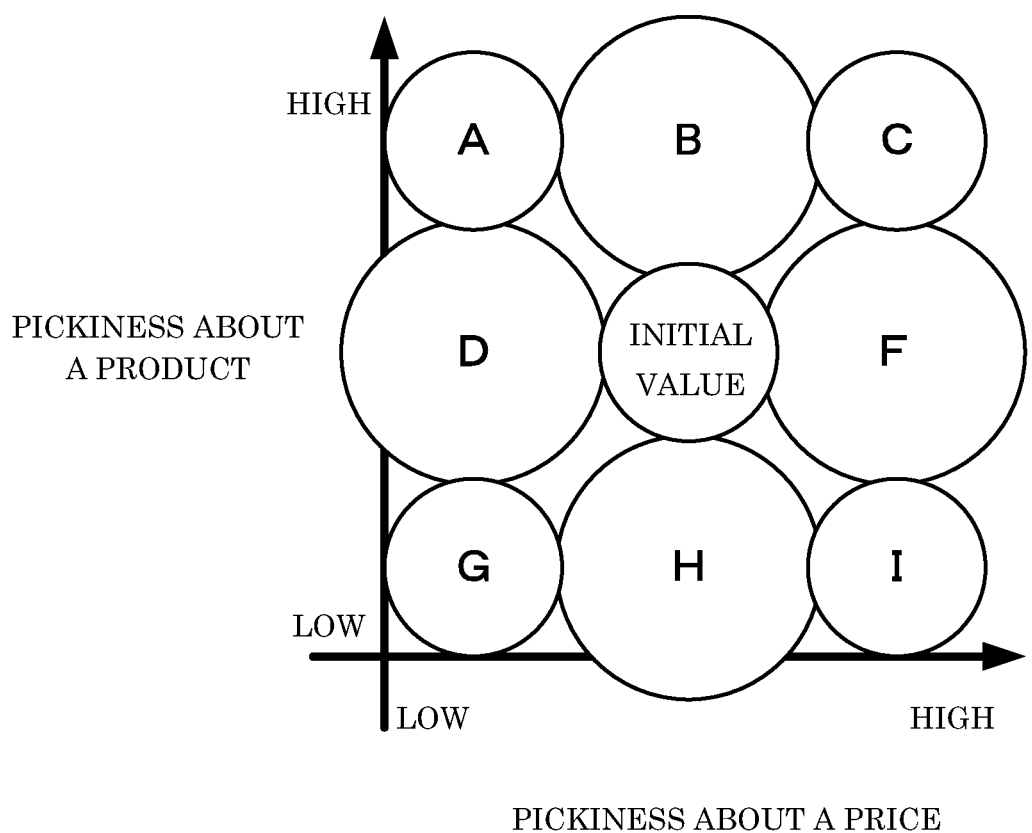
FIG. 22 is a diagram showing an example of distribution of user types in the third pattern of the user type management in the information provision system according to the one embodiment of the present invention.

FIG. 22 is a graph showing distribution of the user types described above. Here, scores related to the basic user type E (normally picky group) are set as initial values upon determining a user type of the user 10.

Figure 23:
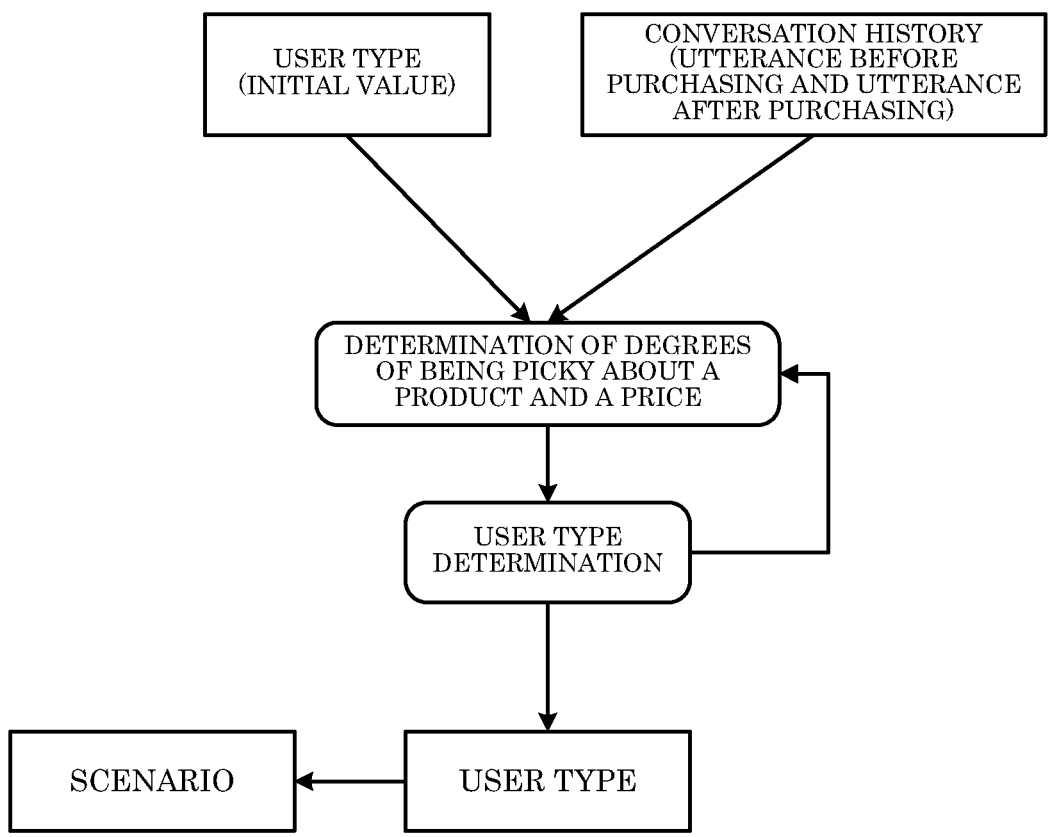
FIG. 23 is a diagram conceptually showing a method of determining a user type in the third pattern of the user type management in the information provision system according to the one embodiment of the present invention.

FIG. 23 is a diagram conceptually showing how a user type with respect to each user 10 is determined in the above-described third pattern. As shown in FIG. 23, based on data inputted by the user 10 onto the user terminal 100 (for example, utterance by the user 10 included in the conversation history data 273, including utterance before purchasing a commodity and utterance after purchasing the commodity) and the like, picky-about items of a user type of the user 10 (degrees of picky-about items) are determined.

In addition, in this example, as the initial values of a user type, those of the user type E are used as mentioned above.

For a predetermined period of time, determination of degrees of picky-about items is conducted, and a user type corresponding to the determined degrees of the picky-about item is determined and is determined as a user type of the user 10.

In addition, as shown in FIG. 23, based on the user type determined as mentioned above, a scenario with respect to the utterance by the user 10 is searched, and in accordance with the scenario, a response is generated.

In addition, since the utterance of the user 10 is accumulated each time the user 10 accesses the information provision system 1, such contents of the utterance are extracted at predetermined timing and a user type can also be thereby re-examined.

Figure 24:
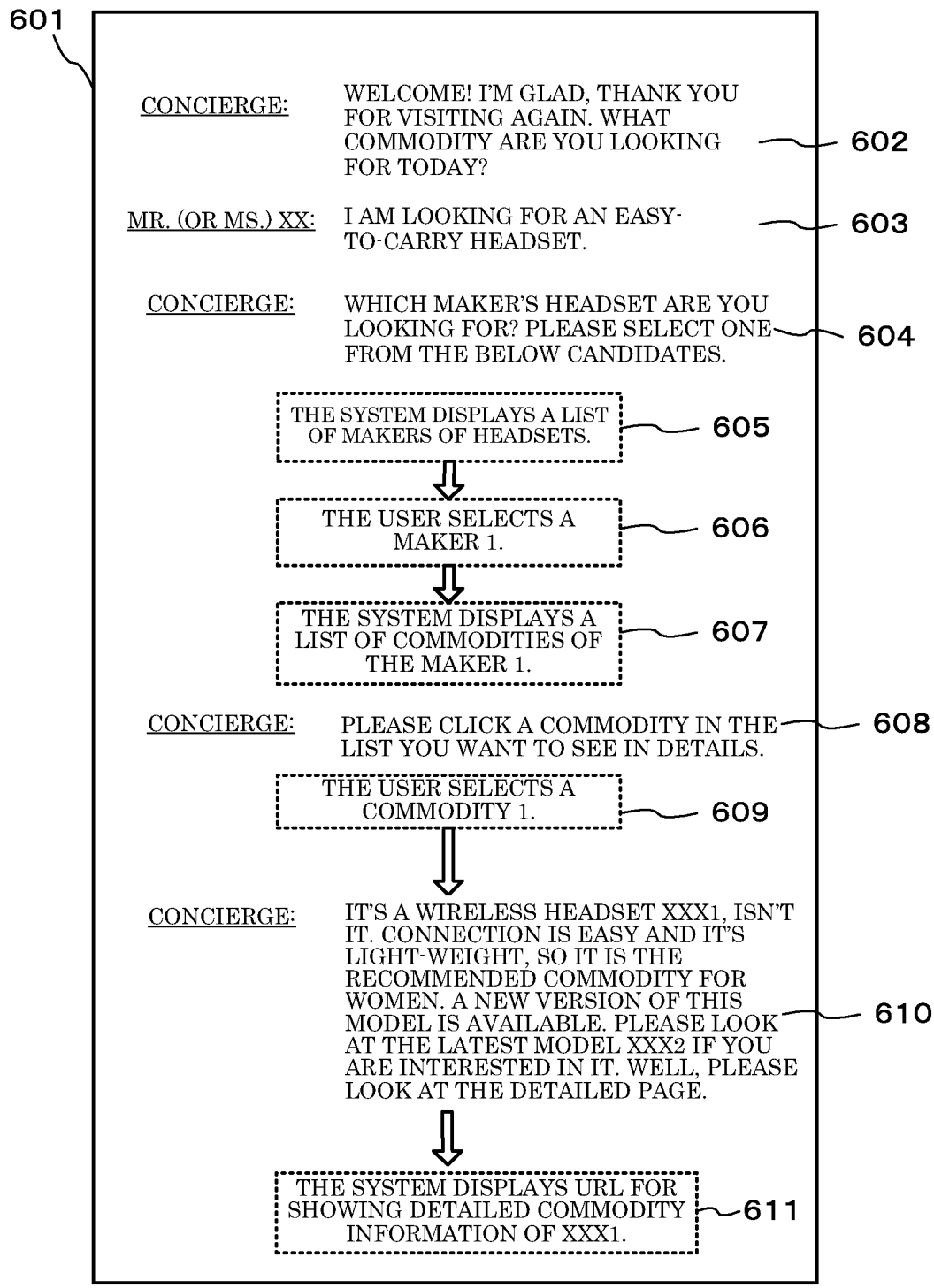
FIG. 24 is a diagram exemplifying a situation in which a user and a concierge have a conversation on a conversation screen in the information provision system according to the one embodiment of the present invention.

Next, with reference to FIG. 24, a situation in which in the commodity search by the user 10, "Mr. (or Ms.) XX" who is the user 10 and a "concierge who is the agent of the information provision system 1 have a conversation will be specifically exemplified. FIG. 24 is a diagram showing an input by the user 10 and contents of a response from the information provision system 1 displayed in the conversation display part 121 of the conversation screen 120 shown in FIG. 3. Here, for the sake of convenience, as the conversation display part 121, a conversation display part 601 which is vertically long is shown, and contents sequentially displayed by operating a scroll bar are concurrently displayed (the same is applied to a conversation display part shown hereinafter).

It is to be noted that in this example, the user type management in the above-described first pattern is used.

In the conversation displayed in the conversation display part 601 shown in FIG. 24, first, in response to logging-in by the user 10, the information provision system 1 makes a response 602 such as "Welcome!". Thereafter, the user 10 makes an input 603 saying "I am looking for an easy-to-carry headset."

Here, the information provision system 1 extracts words "easy-to-carry" from the input by the user 10 and converts key words such as "light-weight" and "compact" which are easily hit upon searching. In addition, as key words, a "headset" and a "wireless headset" are also extracted.

In addition, at this time, the information provision system 1 sets a picky-about item of this user 10 to be "usability" (NO. 6 shown in FIG. 12) based on the key word "compact" and determines a user type="A" (the user 10 is a male in his 10's) from this picky-about item with reference to the user type correspondence table shown in FIG. 13.

Next, the information provision system 1 displays a prompt to select a maker from a plurality of candidates (response 604) and displays a list of makers of a headset in the commodity display part 126 (the commodity display part 126 of the conversation screen 120 shown in FIG. 3) (display processing 605). At this time, the information provision system 1 references the commodity data 262 or the like for searching and displays the list of makers of the headset, obtained as a result of searching.

Thereafter, when the user 10 selects a maker 1 from the list of makers displayed (selection processing 606), the information provision system 1 references the purchase history data 272 or the like, searches headsets manufactured by the maker 1, which are purchased by other user belonging to the user type ="A" and satisfy conditions of the key words "light-weight" and "compact", and displays a list of the headsets obtained as a result of searching in the commodity display part 126 (display processing 607).

It is to be noted that when the information provision system 1 displays the list of makers in the display processing 605, the information provision system 1 may conduct narrowing-down based on a user type and conditions of key words. In addition, the information provision system 1 can also make an inquiry as to color, a price range, and the like to the user 10 and conduct the narrowing-down of commodities based on these pieces of information. Further, the information provision system 1 can also present (or sort) commodities whose models are the latest ones and whose prices are the lowest ones in accordance with preference of the user 10. The preference of the user 10 can be grasped, for example, based on a user type and by referencing the preferred commodity data 264 or the like.

Next, the information provision system 1 prompts the user 10 to browse commodities in a detailed manner, in which the user 10 is interested (response 608). In response thereto, the user 10 selects a commodity 1 from among the displayed list of commodities (selection processing 609).

In response to the selection processing by the user 10, the information provision system 1 displays explanation regarding the selected commodity 1, displays information pertinent to a new version of said model, and prompts the user 10 to browse a detailed page (response 610). The explanation of the commodity 1 and the information pertinent to the new version of the model can be obtained, for example, with reference to recommendation information, new model information, and the like in the commodity data 262.

Thereafter, the information provision system 1 controls the commodity display part 126 to display a WEB page of a maker, in which detailed explanation of the commodity 1 is given (display processing 611). In addition, when the user 10 performs an operation to display the information regarding the new model, the information provision system 1 sets a picky-about item of this user 10 to be "hot-selling" (NO. 7 in FIG. 12), determines a user type="S" from the picky-about item with reference to the user type correspondence table in FIG. 13, and updates the member information data 261 by replacing the user type="A" determined as above with the user type="S" as a user type of the user 10 (or setting the user type="S" together with the user type="A"). As described above, in accordance with not only the input by the user 10 but also various behavior including selection operation such as clicking operation by the user 10, the information provision system 1 can determines a user type.

As described above, the information provision system 1 extracts the key words utilized for determining a user type from the input by the user 10 and extracts the key words for narrowing down the commodities, displays the list of commodities satisfying conditions based on the user type and the key words, and thereby can provide the information pertinent to commodities which are appropriate for the user 10.

Next, with reference to FIG. 25, a situation in the scene of recommendation and collection of evaluation related to a purchased commodity in which "Mr. (or Ms.) YY" who is a user 10 and a "concierge" who is an agent of the information provision system 1 have a conversation will be more specifically exemplified.

It is to be noted that in this example, the user type management in the above-described first pattern is used.

In the conversation shown in a conversation display part 621 in FIG. 25, first, in response to logging-in by the user 10, the information provision system 1 greets the user 10, saying "Welcome!" and the like and subsequently, makes a response 622, providing information pertinent to a campaign and asking evaluation as to the purchased commodity. Such contents of the response by the information provision system 1 can be adjusted in accordance with a total amount of purchase prices and a number of times of visiting of the logging-in user 10. It is to be noted that the total amount of purchase prices and the number of times of visiting thereof by the user 10 are stored in the member information data 261.

In response to this response 622, the user 10 inputs feedback as to the purchased commodity (input 623), saying "it is good because it is very light-weight, compact, and convenient in carrying". Here, the information provision system 1 extracts key words "light-weight" and "compact" from this input, sets a picky-about item of the user 10 to be "usability" (NO. 6 in FIG. 12) based on the key word "compact", and determines a user type ="D" from the picky-about item with reference to the user type correspondence table in FIG. 13 (the user 10 is defined as a female in her 20's).

Next, information provision system 1 proposes introduction of recommended commodities to the user 10 (response 624), and the user 10 accepts this (input 625). In response thereto, the information provision system 1 recommends five commodities, makes a response that a wireless headset manufactured by a maker 1 is particularly recommended among the recommended commodities (response 626), and displays the five commodities in the commodity display part 126 (display processing 627). These recommended commodities are selected based on a user type of the user 10, an average purchase price, a number of times of visiting, hot-selling ranking, user attributes (in 20's and female), and the like.

Further, here, when the information provision system 1 makes an inquiry as to whether the user 10 browses details of the particularly recommended commodity (the wireless headset manufactured by the maker 1) (response 628), the user 10 expresses her intention to browse said details (input 629). In response thereto, the information provision system 1 controls the commodity display part 126 to display a WEB page of the maker in which detailed explanation of the recommended commodity is given (display processing 630).

Figure 26:
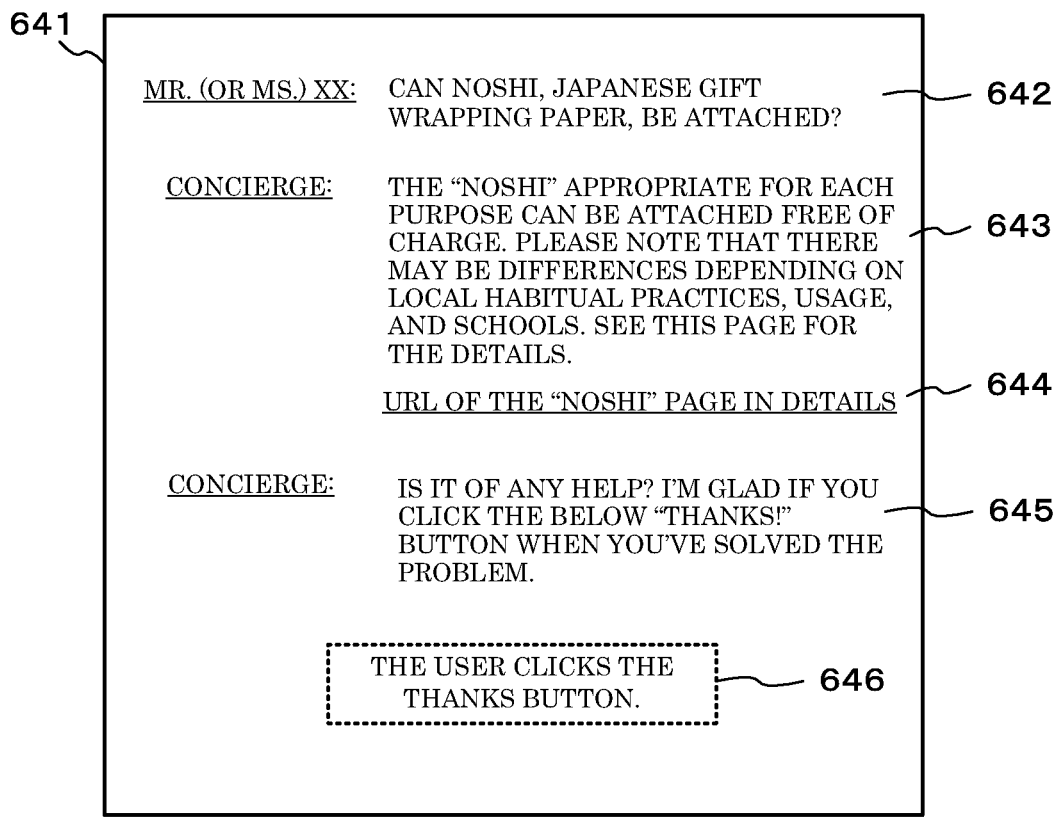
FIG. 26 is a diagram exemplifying a situation in which a user and the concierge have a conversation on a conversation screen in the information provision system according to the one embodiment of the present invention.

Next, with reference to FIG. 26, a situation in the scene of making a request by a customer in which "Mr. (or Ms.) XX" who is a user 10 and a "concierge" who is an agent of the information provision system 1 have a conversation will be more specifically exemplified.

In the conversation shown in a conversation display part 641 in FIG. 26, first, the user 10 makes an inquiry as to whether "Noshi", Japanese gift wrapping paper, can be attached to a commodity (input 642). In response thereto, the information provision system 1 displays a corresponding response sentence previously prepared based on contents of the input (response 643) and displays, as a link text, a URL of a WEB page in which the "Noshi" is explained in details (link text 644).

Thereafter, the information provision system 1 prompts the user 10 to click a Thanks button when the problem is solved (response 645), and in response to this, the user 10 clicks the Thanks button (selection processing 646). A number of times at which the Thanks button is clicked is counted and is stored as a degree of satisfaction in the member information data 261.

Next, with reference to FIG. 27, a situation in the scene of addressing a complaint in which "Mr. (or Ms.) XX" who is a user 10 and a "concierge" who is an agent of the information provision system 1 have a conversation will be more specifically exemplified.

In the conversation shown in a conversation display part 661 in FIG. 27, first, the user 10 conveys a message regarding inadequacy of a commodity and makes an inquiry as to whether the commodity can be returned (input 662). In response thereto, the information provision system 1 displays a corresponding response sentence previously prepared based on contents of the input (response 663), displays a screen of a telephone and a live chat in the commodity display part 126, and starts addressing by an operator (addressing processing 664).

Next, with reference to FIG. 28 to FIG. 35, a situation, in the scene where the user 10 undergoes the commodity searching and purchase addressing by the information provision system 1 and purchases commodities, in which "Mr. (or Ms.) ZZ" who is a user 10 and a "concierge" who is an agent of the information provision system 1 have a conversation will be more specifically exemplified.

Figure 28:
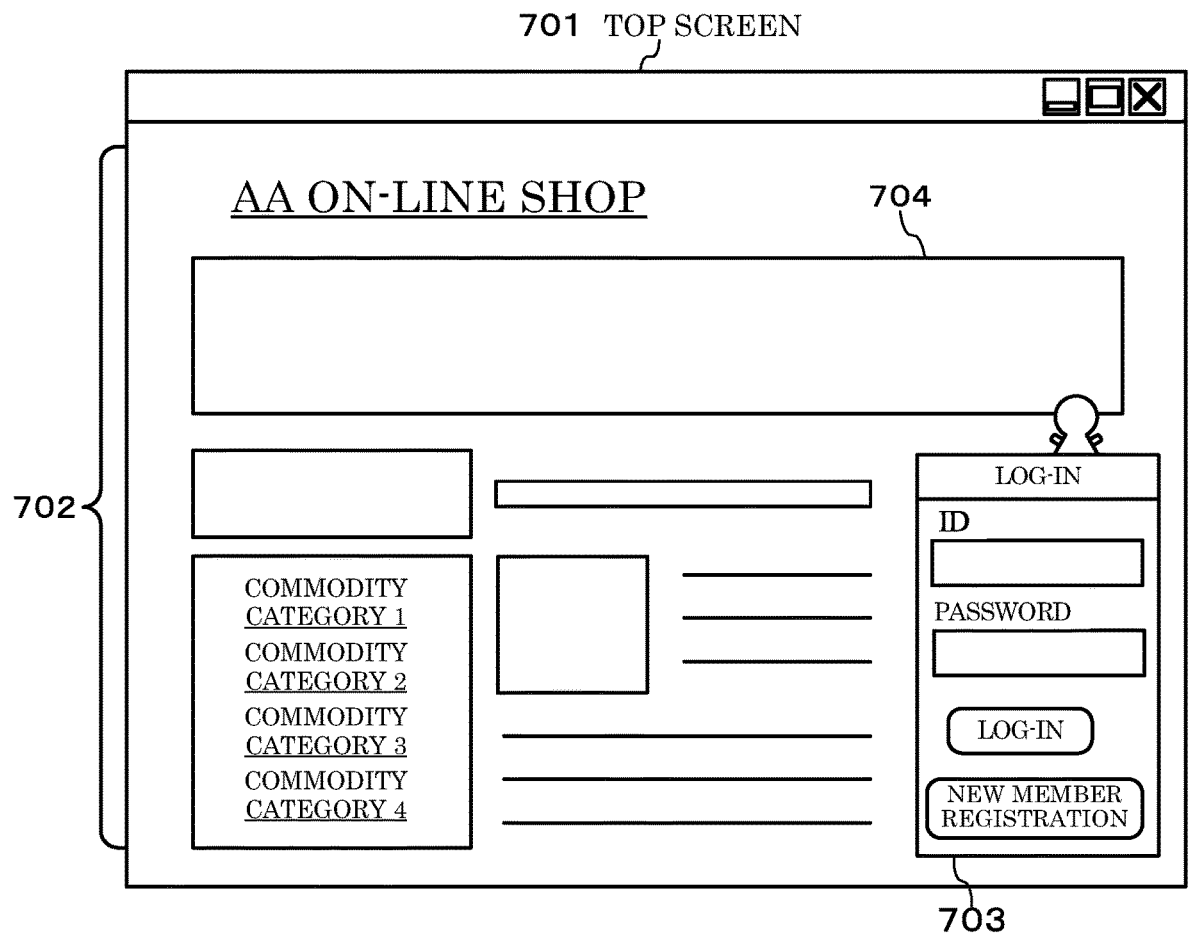
FIG. 28 is a diagram exemplifying a top screen of an Internet shopping site in the information provision system according to the one embodiment of the present invention.

FIG. 28 is a diagram illustrating a top screen 701 of an Internet shopping site (AA on-line shop). The user 10 activates a WEB browser on the user terminal 100, inputs a URL of the AA on-line shop (for example, selects the URL from bookmarks or the like or directly inputs the URL), and displays the top screen 701 in FIG. 28 on a display of the user terminal 100.

On the top screen 701, a top screen display part 702 is arranged, and in an upper portion thereof, a title is displayed and on a left side thereof, a list of categories is displayed. The user 10 browses a variety of pieces of information displayed in this top screen display part 702 and clicks linked texts and images by using a mouse or the like, thereby causing information pertinent to commodities to be displayed in a further detailed manner and conducting a procedure of purchasing desired commodities.

On a right side of the top screen display part 702, a log-in part 703 for connecting to the information provision system 1 according to the present embodiment is displayed, and the user 10 inputs a user ID and a password here and clicks a log-in button by using a mouse or the like. By clicking this log-in button, the user 10 can have a conversation with the information provision system 1 as to purchasing of commodities and the like (in response to the input by the user 10, the information provision system 1 responds).

Upon logging-in, shifting to a conversation screen is conducted, and this conversation screen is the same as the conversation screen 120 shown in FIG. 3. Each of FIG. 29 to FIG. 35 is a diagram showing contents of inputs by the user 10 and contents of responses by the information provision system 1, displayed in a display part corresponding to the conversation display part 121 of the conversation screen 120 shown in FIG. 3. Here, for the sake of convenience, as the display part corresponding to the conversation display part 121, a conversation display part which is vertically long is shown, and contents sequentially displayed by operating a scroll bar are concurrently displayed. In other words, conversation display parts from a conversation display part 711 shown in FIG. 29 to a conversation display part 771 shown in FIG. 35 constitute one connected display part.

It is to be noted that in this example, the user type management in the above-described second pattern is used.

Figure 29:
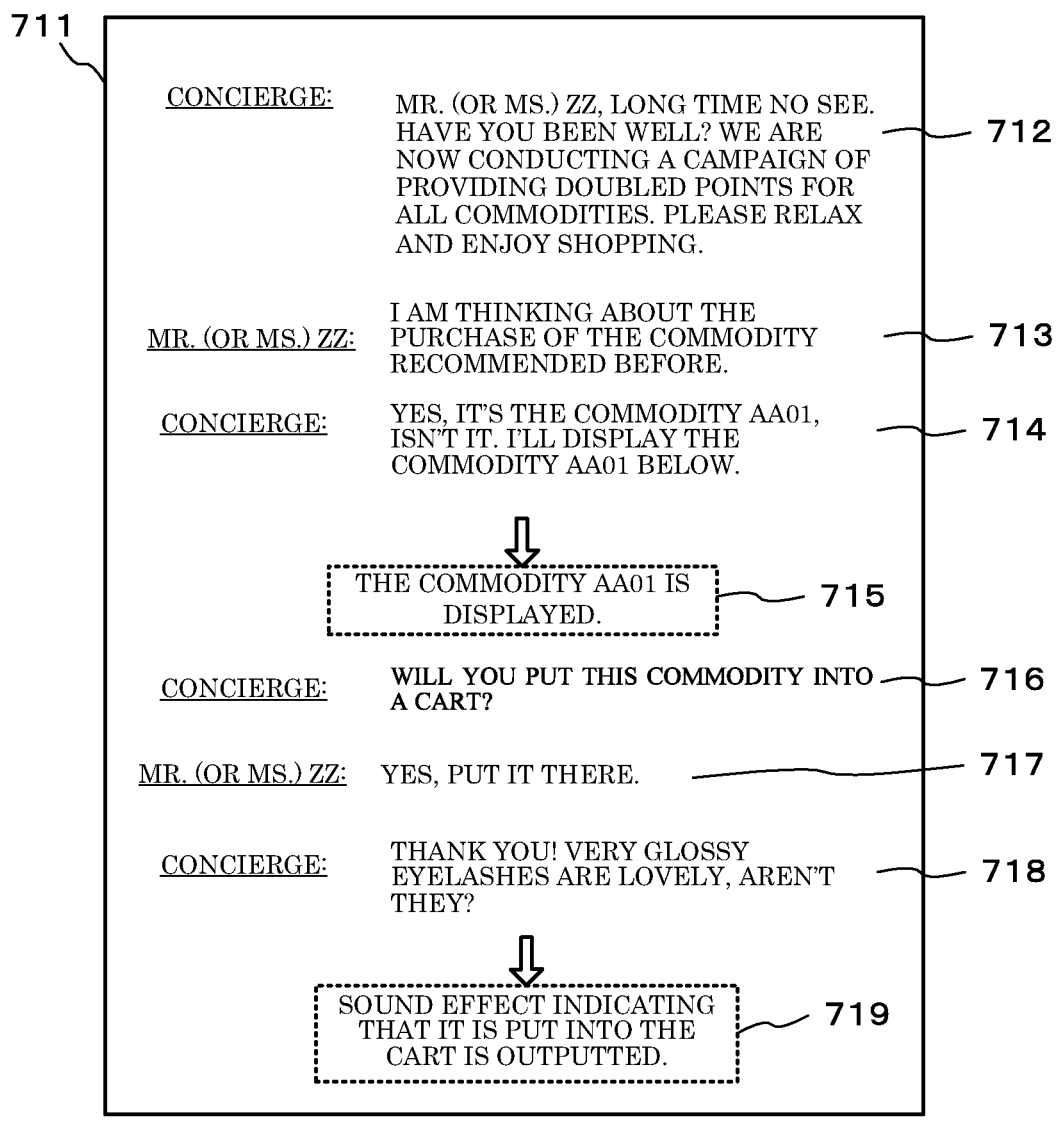
FIG. 29 is a diagram exemplifying a situation in which a user and a concierge have a conversation on a conversation screen in the information system according to the one embodiment of the present invention.

In a conversation shown in the conversation display part 711 in FIG. 29, first, the user 10 logs in the site of the AA on-line shop, and in response thereto, the information provision system 1 greets the user 10, saying "Mr. (or Ms.) ZZ, Long time no see. Have you been well?" or the like and makes a response 712 including announcement of a campaign and the like. Based on a nickname, campaign information, a previous browsing period of time, and the like, the above-mentioned greeting is generated based on a scenario.

Here, the user 10 makes an input 713 saying "I am thinking about the purchase of the commodity recommended before". Here, based on the input by the user 10, the information provision system 1 makes a response 714 asking whether or not the commodity (commodity AA01) recommended before is put into a cart. The commodity recommended to the user 10 before is stored as a purchase examining commodity, for example, in the recommendation history data 271 and the preferred commodity data 264. In addition, at this time, the information provision system 1 deems that with respect to the user 10, a preference degree as to said commodity is increased and performs addition to a preference degree score of said commodity. The above-mentioned preference degree score can be recorded in the preferred commodity data 264.

The information provision system 1 displays information pertinent to the commodity AA01 together with the above-mentioned response 714 in a commodity display part corresponding to the commodity display part 126 of the conversation screen 120 shown in FIG. 3 (display processing 715).

Here, the information provision system 1 asks whether or not the commodity AA01 is put into the cart (response 716), and in response thereto, the user 10 expresses her intention to put the commodity AA01 into the cart (input 717).

At this time, the information provision system 1 deems that the user 10 purchases the recommended commodity without having further pickiness and performs addition by a predetermined number to a score of the picky-about item "a degree of accepting recommendation" of the user 10. When due to a change in the above-mentioned score, the user 10 comes to belong to other user type, the member information data 261 is updated so as to associate the user 10 with said changed user type.

In response to the input 717 by the user 10, the information provision system 1 makes a response 718 saying "Very glossy eyelashes are lovely, aren't they?" This is cited from, for example, recommendation information related to said commodity AA01 stored in the commodity data 262.

Here, the information provision system 1 controls the user terminal 100 to output sound effect indicating that the commodity AA01 is put into the cart (sound effect output processing 719).

The conversation proceeds to contents shown in a conversation display part 721 in FIG. 30, and the user 10 issues an instruction to purchase the usual commodity which the user 10 often purchases (input 722). In response to this input 722, the information provision system 1 references the purchase history data 272 and identifies the usual makeup remover (commodity AA02). At this time, the information provision system 1 deems that the user 10 has attributes of preferring commodities which the user 10 gets used to using and thus, performs addition by a predetermined number to a score of the picky-about item "being picky about a product". In addition, when due to this, the user type is changed, as described above, the member information data 261 is updated.

In addition, the information provision system 1 deems that with respect to the user 10, a preference degree related to said commodity is increased and performs addition to a preference degree score of said commodity.

Next, the information provision system 1 confirms with the user 10 that the usual commodity is the commodity AA02 (response 723).

Here, the user 10 confirms whether an economy size of the commodity AA02 is available (input 724). Here, the information provision system 1 references the commodity data 262 and checks whether or not the economy-size model of the commodity AA02 is available. In addition, the information provision system 1 deems that the user 10 has attributes of being conscious about economical commodities and thus, performs addition by a predetermined number to a score of the picky-about item "being picky about a price". In addition, when due to this, the user type is changed, as described above, the member information data 261 is updated.

Since the economy-size model of the commodity AA02 is confirmed to be available, the information provision system 1 generates and displays the fact and information pertinent to comparison with the commodity AA02 (response 725). Here, when the user 10 makes a request as to a discount (input 726), the information provision system 1 deems that the user 10 has attributes of being conscious about economical commodities and thus, performs addition by a predetermined number to a score of the picky-about item "being picky about a price". In addition, when due to this, the user type is changed, as described above, the member information data 261 is updated.

Figure 31:
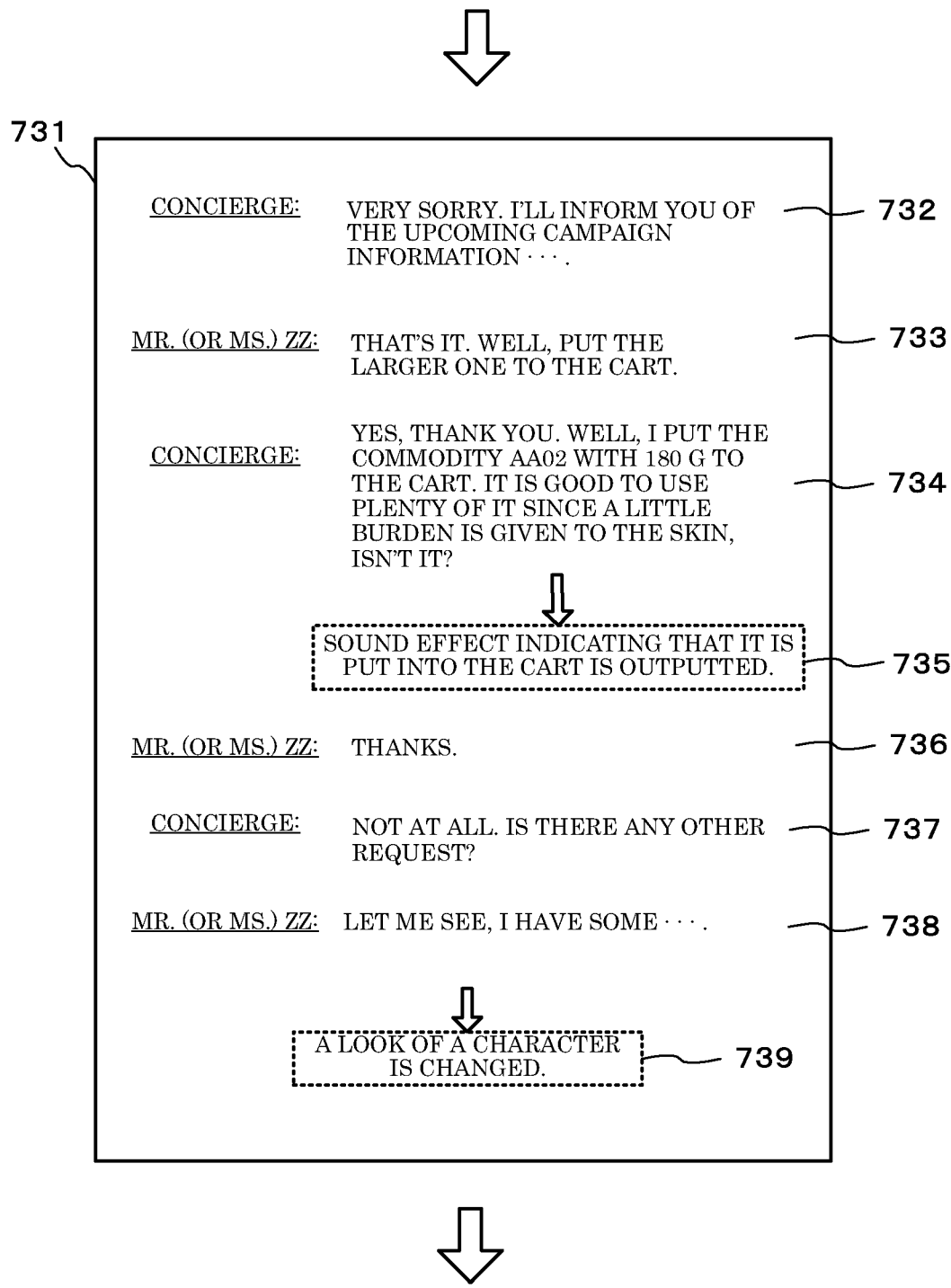
FIG. 31 is a diagram exemplifying the situation in which the user and the concierge have the conversation on the conversation screen in the information provision system according to the one embodiment of the present invention.

The conversation proceeds to contents shown in a conversation display part 731 in FIG. 31, and there, the information provision system 1 conveys a message that the discount is impossible (response 732). This information can be confirmed by referencing discount information pertinent to said commodity in the commodity data 262.

Next, the user 10 accepts the impossibility thereof and issues an instruction to purchase the economy-size model of the commodity AA02 (input 733). In response to this input 733, the information provision system 1 makes a response 734 saying "It is good to use plenty of it since a little burden is given to the skin, isn't it?" This is cited from, for example, recommendation information pertinent to said commodity AA02 (180g) stored in the commodity data 262.

The information provision system 1 controls the user terminal 100 to output sound effect indicating that the commodity AA02 (180g) is put into the cart (sound effect output processing 735).

Thereafter, the user 10 makes an input 736 saying "Thanks you". In response to this, the information provision system 1 makes a response 737 asking that there is other request. Here, while the user 10 is making an input 738 so as to recall other request (or after the elapse of a predetermined period of time since the response 737), the information provision system 1 determines that it is better to wait a response for a little while and controls a look of a character of the concierge to be changed so as to wait with the expression of expectation (look change processing 739).

The conversation proceeds to contents shown in a conversation display part 741 in FIG. 32, and the user 10 inputs a request related to a countermeasure against freckles (input 742). Here, the information provision system 1 deems that with respect to the user 10, a preference degree related to a freckle countermeasure commodity is increased and performs addition to a preference degree score of said commodity. The above-mentioned preference degree score can be recorded in the preferred commodity data 264.

Next, the information provision system 1 makes a prompt to display a list of freckle-related commodities (response 743). At this time, the information provision system 1 references the purchase history of other user whose user type is the same as the user type of the user 10 and displays the list of freckle-related commodities based on predetermined criteria (for example, in the well-selling order) (display processing 744). In addition, upon determining the recommended commodities as mentioned above, the information provision system 1 references the purchase history and the commodity browse history of the user 10 and based on these, can determine the recommended commodities and the order of displaying the recommended commodities.

Here, further, the information provision system 1 makes sure the user 10 has not purchased any freckle countermeasure commodity and makes an inquiry saying "Do you have any question?" (response 745). In response thereto, the user 10 makes an input saying "I have no idea which one is good" (input 746), and then, the information provision system 1 proposes classifying the freckle-related commodities by purposes (response 747). It is to be noted that in the commodity data 262, in addition to the commodity categories, by-purpose classifications are associated with the respective commodities.

Here, when the user 10 makes an input murmuring "I want to remove freckles" (input 748), the information provision system 1 determines that the input by the user 10 aims at "caring for freckles" and determines a commodity AA03 as a recommended commodity (response 749). It is to be noted that here, the information provision system 1 deems that with respect to the user 10, a preference degree related to caring for the freckles is increased and performs addition to a preference degree score of a preference target which is the caring for the freckles. The preference degree score as mentioned above can be recorded in the preferred commodity data 264.

The conversation proceeds to contents shown in a conversation display part 751 in FIG. 33, and the user 10 makes a question related to the recommended commodity AA03, asking "Does this clear the freckles?" (input 752). At this time, the information provision system 1 deems that the user 10 has attributes of caring about effect and performs addition by a predetermined number to a score of a picky-about item "being picky about a product". In addition, when due to this, the user type is changed, as described above, the member information data 261 is updated.

Next, in response to the question of the user 10, the information provision system 1 explains active ingredients and introduces comments of customers (response 753). In addition, the information provision system 1 controls the commodity display part corresponding to the commodity display part 126 to sequentially display the comments of customers in a pop-up manner together with this response 753 (display processing 754). It is to be noted that the explanation on the active ingredients and the comments of customers are extracted from detailed information of commodities and customer information stored in the commodity data 262 based on predetermined criteria.

Thereafter, when the user 10 makes an input 755 saying "It seems nice . . . ", the information provision system 1 determines based on this input 755 that now, it is recommendation timing, extracts feeling in use from customer information of the commodity stored in the commodity data 262, allows the user 10 to feel a use image by displaying the extracted feeling in use, and provides a positive comment, which prompts the user 10 to purchase the commodity, for the user 10 (response 756).

Thereafter, when the user 10 makes an input 757 saying "But it's not now, I'll buy it on a payday!", the information provision system 1 determines that the recommendation timing is finished and causes a response 758, which makes an offer of examining the commodity next time, to be displayed. In addition, here, the information provision system 1 stores the commodity AA03 as a purchase examining commodity of the user 10 in the preferred commodity data 264.

Figure 34:
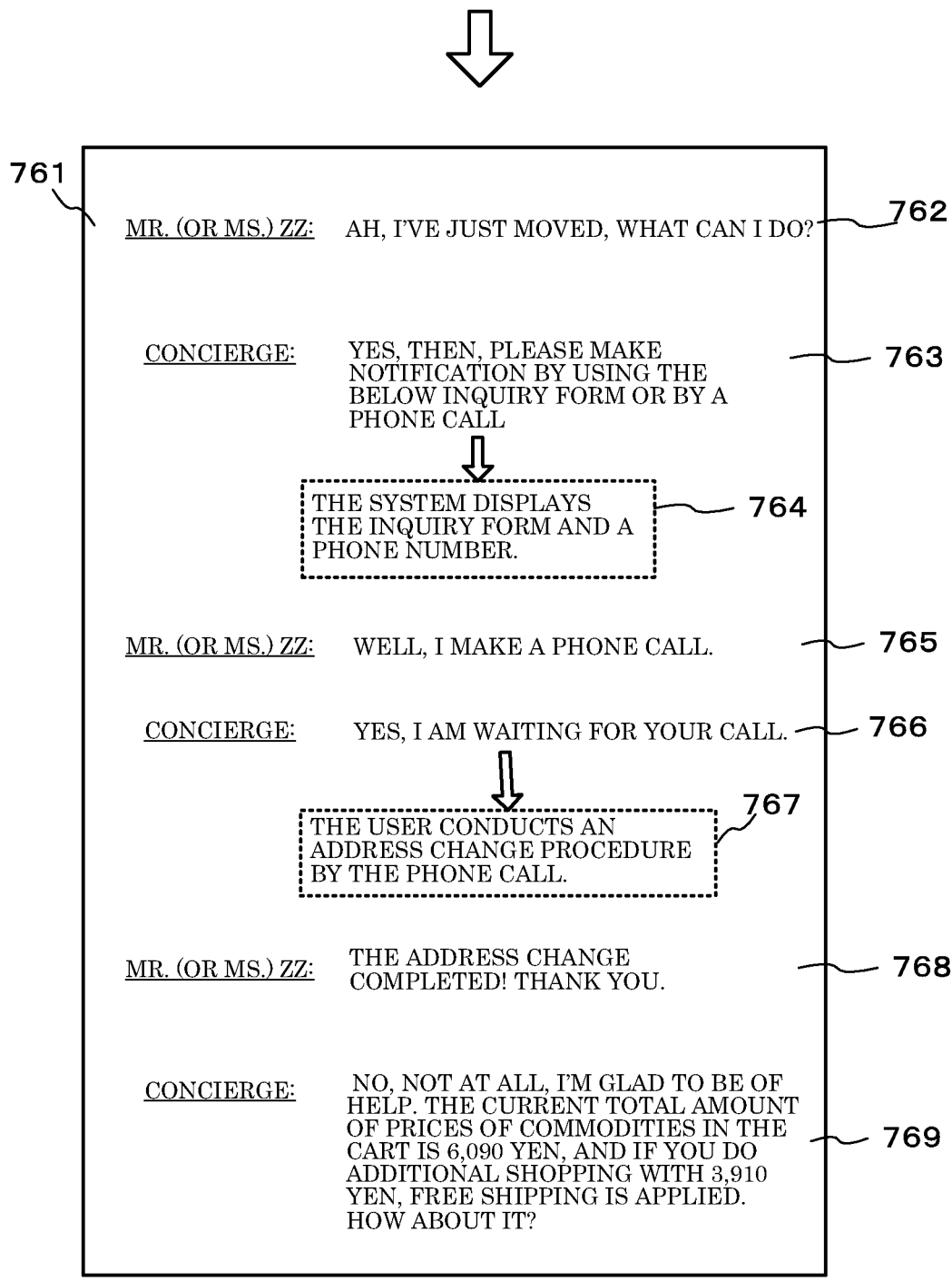
FIG. 34 is a diagram exemplifying the situation in which the user and the concierge have the conversation on the conversation screen in the information provision system according to the one embodiment of the present invention.

The conversation proceeds to contents shown in a conversation display part 761 in FIG. 34. Next, the user 10 asks a question as to a procedure upon moving home (input 762). At this time, the information provision system 1 collates contents of the question with the FAQ answer collection 282 and causes a way of answering FAQ corresponding to the question (response 763) to be displayed. Here, the information provision system 1 prompts the user 10 to make notification by using an inquiry form or by a phone call and displays the inquiry form and a phone number in the commodity display part corresponding to the commodity display part 126 (display processing 764).

Then, the user 10 makes an input 765 saying "Well, I make a phone call." and the information provision system 1 makes a response 766 saying "Yes, I am waiting for your call."

Thereafter, when the user 10 conducts an address change procedure by the phone call (address change processing 767) and makes an input 768 saying "The address change completed, thank you", the information provision system 1 determines that here, the user 10 intends to finish shopping and provides information as to free shipping in addition to a reply to the words of thanks from the user 10 (response 769).

The conversation proceeds to contents shown in a conversation display part 771 in FIG. 35. The user 10 asks a question as to a shipping cost (input 772). Then, the information provision system 1 collates contents of the question with the FAQ answer collection 282 and causes a way of answering FAQ corresponding to the question (response 773) to be displayed. The information provision system 1 calculates a shipping cost based on relationship between a total amount of prices of commodities in the cart and a shipping cost and notifies the user 10 of the calculated money amount of the shipping cost. In addition thereto, the information provision system 1 notifies the user 10 of a money amount required for further shopping with which free shipping is applied and includes, in a response 773, information that if the commodity AA03 which is the purchase examining commodity is purchased, the free shipping is applied.

Thereafter, when the user 10 makes an input 774 saying "Certainly, . . . what should I do", the information provision system 1 determines that now, it is recommendation timing and causes a seasonal recommendation sentence included in recommendation information related to the commodity AA03 and campaign information included in discount information stored in the commodity data 262 to be displayed as a response 775.

Here, when the user 10 makes an input 776 saying "Hm, well, I'll buy it!", the information provision system 1, because the user 10 has accepted the recommended commodity, performs addition by a predetermined number to a score of the picky-about item "accepting recommendation". In addition, when due to this, the user type is changed, as described above, the member information data 261 is updated.

Base on the indication of the intention of the purchase by the user 10 (input 776), the information provision system 1 causes words of thanks and a comment of recommendation from recommendation information related to the commodity AA03 (stored in the commodity data 262) to be displayed (response 777). The information provision system 1 shifts the conversation screen to a cart information confirmation screen for conducting a procedure of purchasing (display processing 778). In addition, at this time, the information provision system 1 stores the commodity AA03 in the purchase history data 272 so as to be associated with the user 10. In addition, success rates of recommended commodities may be separately registered.

Figure 36:
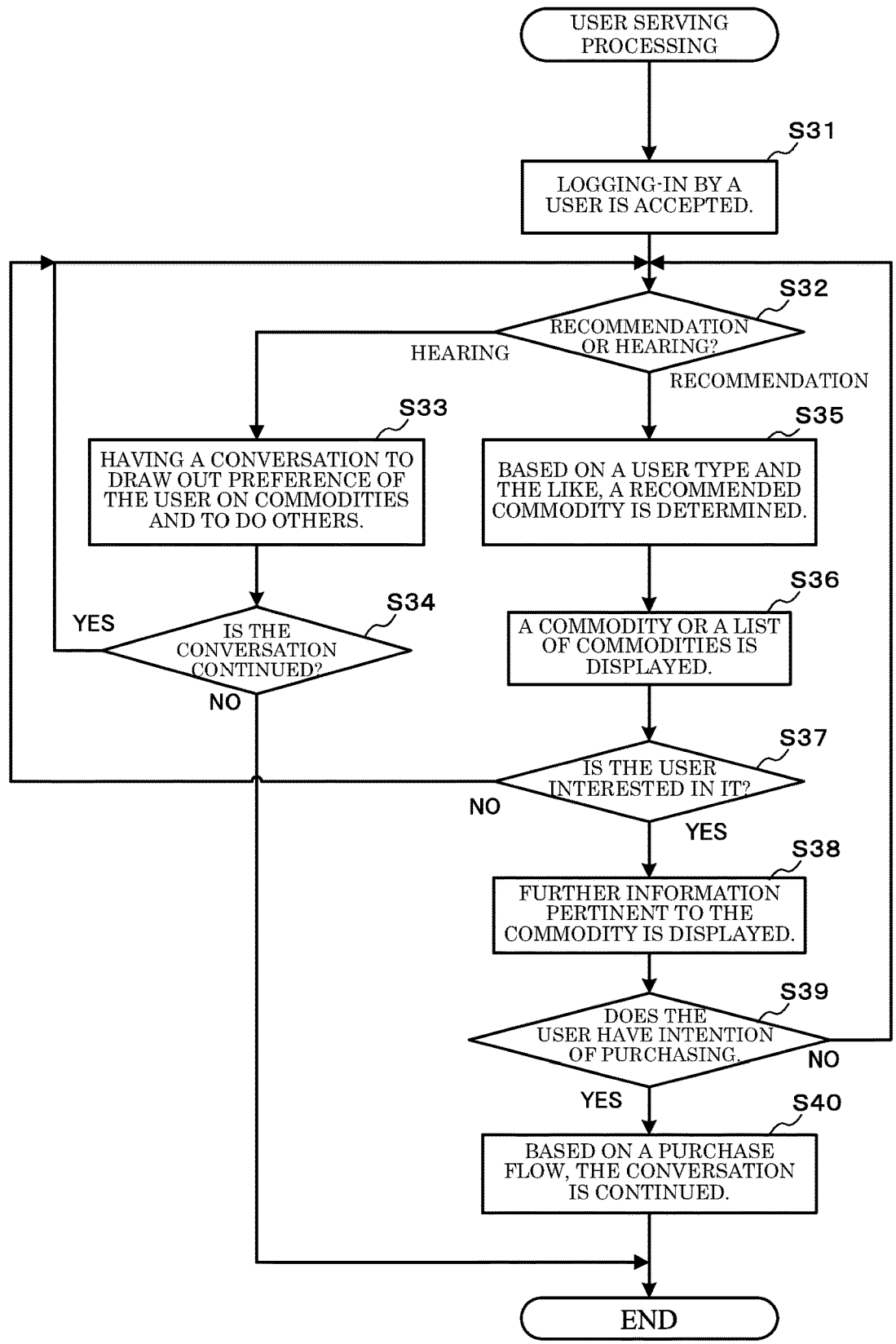
FIG. 36 is a flowchart showing a typical pattern of a user serving processing procedure in the information provision system according to the one embodiment of the present invention.

Next, with reference to FIG. 36, a typical pattern of the above-described user serving processing in the information provision system 1 according to the present embodiment will be described. FIG. 36 is a flowchart showing a typical procedure of the user serving processing.

First, at step S31, logging-in by the user 10 is accepted. A user ID and a password inputted from the user terminal 100 of the user 10 (for example, from a top screen of Internet shopping) are authenticated based on the member information data 261 in the information provision system 1. When the authentication thereof is OK, the processing proceed to the next step, and when the authentication thereof is not OK, an error message is outputted onto the user terminal 100.

Next, at step S32, based on contents of utterance (input) by the user 10, extracted key words, and the like, the information provision system 1 determines either to provide the user 10 with information pertinent to recommended commodities (that is, to make recommendation) or to wait for utterance by the user 10 (that is, to make a hearing).

When it is determined that the hearing is made, the processing proceeds to step S33, the information provision system 1 waits for the utterance by the user 10 there, and further, outputs a response so as to draw out utterance related to commodity preference of the user 10, thereby having a conversation with the user 10. Next, at step S34, the information provision system 1 determines whether or not to continue the conversation with the user 10, and upon determining from contents of the utterance by the user 10 that the user 10 is not interested in a commodity or commodities or purchasing the commodity or the commodities (NO at step S34), the processing is finished.

Upon determining therefrom that the user 10 is interested in the commodity or commodities or purchasing the commodity or the commodities (YES at step S34), the processing returns to step S32 again, and the determination as to either the recommendation or the hearing is repeated.

At step S32, upon determining that the recommendation is made, the processing proceeds to step S35, and there, based on a user type of the user 10, contents of the utterance, a purchase history, and the like, a recommended commodity or commodities is or are determined. The determination of the recommended commodity or commodities is conducted, for example, in the procedure shown in the flowchart in FIG. 17. Next, at step S36, the information provision system 1 controls the display of the user terminal 100 to display the determined recommended commodity (or a list of recommended commodities) (for example, causes the commodity display part corresponding to the commodity display part 126 to display the determined recommended commodity).

Next, at step S37, it is determined whether or not the user 10 is interested in the displayed recommended commodity or commodities, and when the user 10 is not interested in the displayed recommended commodity or commodities (NO at step S37), with the conversation being continues, the processing returns to step S32 again, and the determination as to either the recommendation or the hearing is repeated.

At step S37, when it is determined that the user 10 is interested in the displayed recommended commodity or commodities (YES at step S37), at step S38, further detailed information pertinent to the recommended commodity or commodities (for example, positive comments such as words of recommendation, campaign information, and comments of customers) is displayed, and the user 10 is prompted to click a commodity icon displayed in the commodity display part.

Next, at step S39, it is determined based on utterance and behavior of the user 10 whether or not the user 10 has intention of purchasing. At step S39, upon determining that the user 10 has no intention of purchasing (NO at step S39), with the conversation being continued, the processing returns to step S32 again, and the determination as to either the recommendation or the hearing is repeated.

Upon determining that the user 10 has the intention of purchasing (YES at step S39), at step S40, a flow of the procedure of purchasing is executed, and information related to a procedure required for purchasing the commodity is provided for the user 10.

Next, with reference to FIG. 37, in the information provision system 1 according to the present embodiment, how to determine recommendation timing at which the recommended commodity is displayed and how to recommend a commodity will be described. FIG. 37 is a diagram showing several examples in which kinds of inputs by user 10, determination on the kinds of inputs, and final policies of recommendation based on the determination on the kinds of inputs are shown.

In a NO. 1 pattern in FIG. 37, when key words such as "So it is", "It's true", and "Certainly" are extracted from the input by the user 10, it is determined that the user 10 shows simple affirmation; and when key words such as "I'm not so sure" and "Not really" are extracted therefrom, it is determined that the user 10 shows simple negation.

In a NO. 2 pattern in FIG. 37, when key words such as "Aye", "It is so", "I know it", and "it's nice" are extracted from the input by the user 10, it is determined that the user 10 shows interest; and when key words such as "Is there anything else?" are extracted therefrom, it is determined that the user 10 shows no interest.

In a NO. 3 pattern in FIG. 37, when an input by the user 10 is a comment "it is inorganic feeling, rather than cool one, isn't it", such an input is determined to be a comment including evaluation items such as a design, a price, a function, usability, and reputation.

In a NO. 4 pattern in FIG. 37, when an input by the user 10 is a comment "Certainly, the design is good, but the price is . . . ", it is determined that the user 10 shows composite negation. In addition, in a NO. 5 pattern, when an input by the user 10 is a comment "Is there any benefit for a member?", the input is classified as other kind.

In the above-described NO. 1 to NO. 3 patterns, the information provision system 1 controls the recommendation in accordance with a scenario so as to proceed to a flow in which that commodity or a commodity different from that commodity is recommended while probing whether the user 10 has purchasing willingness, as recommendation policy.

On the other hand, in the above-described NO. 4 pattern, when comments of affirmation and negation related to evaluation target items are inputted, the information provision system 1 recommends a commodity by providing follow-up information pertinent to the targeted evaluation items and adding other evaluation items and controls the recommendation in accordance with a scenario so as to proceed to a flow in which that commodity or a commodity different from that commodity is recommended while probing whether the user 10 has purchasing willingness, as recommendation policy.

In addition, in the above-described NO. 5 pattern, on condition that there is no relation with the above-described patterns, when the user 10 makes an input or after that input, the information provision system 1 makes a confirmation for that input and controls the recommendation in accordance with a scenario so as to introduce the next commodity or stand by as it is.

Figure 38:
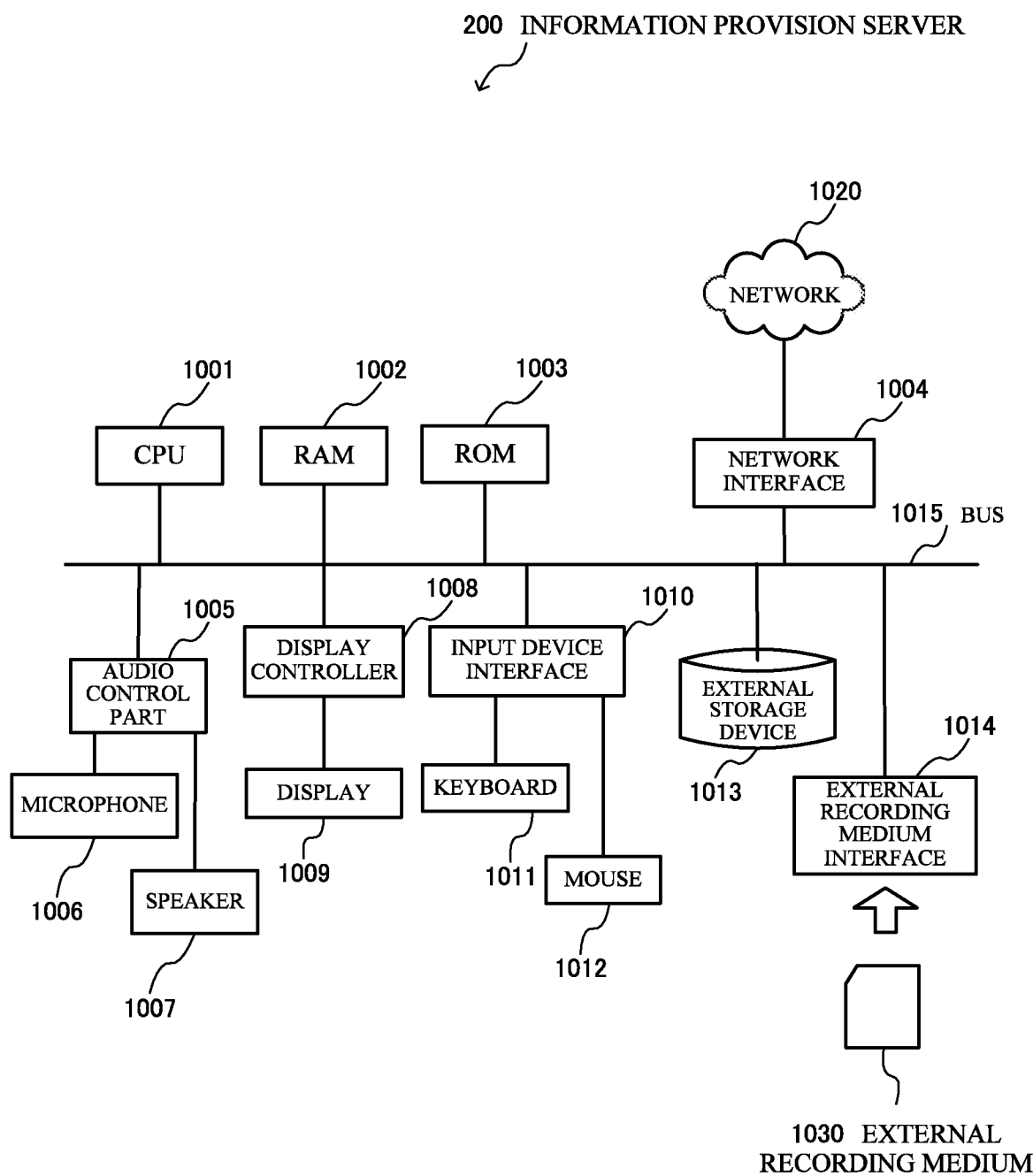
FIG. 38 is a diagram showing an example of a hardware configuration of a computer constituting the information provision server included in the information provision system according to the present invention.

Next, with reference to FIG. 38, an example of a hardware configuration of a computer constituting the information provision server 200 in the information provision system 1 according to the embodiment of the present invention will be described. It is to be noted that the configuration of the information provision server 200 shown in FIG. 38 merely exemplifies a representative configuration.

The information provision server 200 includes a CPU (Central Processing Unit) 1001, a RAM (Random Access Memory) 1002, a ROM (Read Only Memory) 1003, a network interface 1004, an audio control part 1005, a microphone 1006, a speaker 1007, a display controller 1008, a display 1009, an input device interface 1010, a keyboard 1011, a mouse 1012, an external storage device 1013, an external recording medium interface 1014, and a bus 1015 mutually connecting these constituent parts.

The CPU 1001 controls operation of the respective constituent parts in the information provision server 200 and under the control of OS, controls execution of the input analysis part 202, the response control part 203, and the like according to the present invention.

The RAM 1002 has temporarily stored therein programs for executing each processing executed by the CPU 1001 and data used during executing each of these programs. The ROM 1003 has stored therein programs and the like executed upon booting the information provision server 200.

The network interface 1004 is an interface for connecting to the network 1020. The network 1020 is, for example, a network between the information provision server 200 and the user terminal 100 and correspond to the network 300 shown in FIG. 1.

The audio control part 1005 controls the microphone 1006 and the speaker 1007, controlling inputting and outputting of voice. The display controller 1008 is a dedicated controller for actually processing drawing instructions issued by the CPU 1001. The display 1009 is a display device constituted of, for example, an LCD (Liquid Crystal Display) or a CRT (Cathode Ray Tube). The display 1009 can also be constituted of a touch panel display which can be operated by touching.

The input device interface 1010 receives signals inputted from the keyboard 1011 and the mouse 1012 and transmits, to the CPU 1001, predetermined commands in accordance with signal patterns.

The external storage device 1013 is, for example, a storage device such as a hard disk and a semiconductor memory and has stored therein the above-mentioned programs and data, and upon executing the programs, as needed, the above-mentioned programs and data are loaded to the RAM 1002. For example, the information provision management DB 250 shown in FIG. 1 and the like can be stored in the external storage device 1013.

The external recording medium interface 1014 accesses the external recording medium 1030 and reads data recorded therein. The external recording medium 1030 is, for example, a portable flash memory, a CD (Compact Disc), a DVD (Digital Versatile Disc), or the like. Programs, executed by the CPU 1001, for realizing the respective functions of the present invention are provided via this external recording medium interface 1014 from the external recording medium 1030. In addition, as other distribution form in which the programs for realizing the respective functions of the present invention are provided, a route or the like in which the programs and the like are provided from a predetermined server on a network via the network 1020 and the network interface 1004 and stored in the external storage device 1013 or the RAM 1002 can also be considered. p The one example of the hardware configuration of the information provision server 200 in the information provision system 1 according to the one embodiment of the present invention is described. Basically, the user terminal 100 according to the present invention also is a computer having the same configuration as above. However, here, as for the information provision server 200, the audio control part 1005, the microphone 1006, the speaker 1007, the display controller 1008, the display 1009, the input device interface 1010, the keyboard 1011, and the mouse 1012 are not indispensable constituent parts.

It is to be noted that although hereinabove, the information provision system 1 according to the one embodiment of the present invention is described by illustrating the specific examples which allow the present invention to be implemented, each of these specific examples is merely one example for describing the present invention, and the scope of the right of the present invention is not limited to these specific examples. By employing various other methods and configurations, the technical idea of the present invention can be realized.

REFERENCE SIGNS LIST 1 information provision system
10 user
100 user terminal
200 information provision server
250 information provision management DB
300 network
1001 CPU
1002 RAM
1003 ROM
1004 network interface
1005 audio control part
1006 microphone
1007 speaker
1008 display controller
1009 display
1010 input device interface 1011 keyboard
1012 mouse
1013 external storage device
1014 external recording medium interface
1015 bus

What is claimed is:

1. An information provision server, comprising:
a server system comprising one or more interconnected servers; and
a CPU;
wherein the server system includes
1) a first data repository associating predefined keywords with predefined picky-about items, the picky-about items being indicative of user preferences with respect to commodity aspects that affect a decision to purchase a commodity of a given desired-commodity category;
2) a second data repository associating each of predefined user types with predefined user attributes and with picky-about items selected from among the predefined picky-about items,
3) a member database storing therein member data, the member data including for each of a plurality of users of the information provision server a) a user type selected from among the predefined user types, b) user attributes selected from among the predefined user attributes, c) a set of scores associated with picky-about items selected from among the predefined picky-about items, and d) system interaction history including purchase history;
4) a commodity database storing therein information pertaining to a plurality of commodities that are available for purchase via the information provision server; and
5) a machine agent adapted to engage in natural language interaction with a user of the server system through an interface using information retrieved from one or more of the first data repository, the second data repository, the member database, and the commodity database;
wherein the information provision server is configured to cause the CPU to execute steps including
receiving input from a using user of the information provision server, the input obtained from the using user by a particular natural language interaction between the using user and the machine agent, the input comprising natural language text including one or more words and indicating a desired-commodity category;
identifying within the input one or more inputted keywords from among the one or more words comprising the input;
using data retrieved from the first data repository, determining picky-about items associated with the using user based on the inputted keywords, the picky-about items associated with the using user being selected from among the predefined picky-about items in the first data repository;
using data retrieved from the second data repository and the member database, determining a user type associated with the using user based on 1) the using user's associated picky-about items, 2) the using user's attributes stored in the member database, and 3) the set of scores for the using user, and storing the using user's associated user type in the member database;
searching the commodity database to identify one or more suggested commodities, said searching based on 1) the desired commodity category, 2) the inputted keywords identified within the input, and 3) the purchase history data stored in the member database for members having the same user type as the using user with respect to commodities of the same category as the desired-commodity category;
transmitting an offer to the using user for the one or more suggested commodities; and
updating over time the set of scores stored in the member database for the using user based on subsequently received and identified inputted keywords.

2. The information provision server of claim 1, wherein the suggested commodities are offered to the using user in a ranked manner.

3. The information provision server of claim 1, wherein the information provision server is further configured such that if the using user is a first-time user of the information provision server, the CPU causes the set of scores stored in the member database to be determined initially by performing an initial diagnostic test.

4. The information provision server of claim 1, wherein the predefined user attributes include age and gender of the users stored within the member database.

5. The information provision server of claim 1, wherein the set of scores stored in the member database for each user also includes a score indicative of a given user's tendency to accept recommendations from the information provision server.

6. The information provision server of claim 1, wherein the information provision server is further configured to cause the CPU to execute steps including
receiving responsive input from the using user in response to the one or more suggested commodities being offered to the using user, the responsive input comprising one or more responsive words; and
identifying within the responsive input one or more responsive keywords from among the one or more responsive words.

7. The information provision server of claim 6, wherein the information provision server is further configured to cause the CPU to execute steps including
updating the one or more suggested commodities based on the responsive keywords; and
causing to be offered to the using user the updated one or more suggested commodities.

8. The information provision server of claim 6, wherein the information provision server is further configured to cause the CPU to execute steps including pausing or terminating offering of suggested commodities to the using user based on time-related responsive keywords.

9. The information provision server of claim 8, wherein the information provision server is further configured to cause the CPU to execute steps including
receiving a selection-indicating input indicating that the using user has selected a selected commodity from among the one or more suggested commodities; and
storing in association with the using user, upon said pausing or terminating offering of suggested commodities, an identifier of the selected commodity.

10. The information provision server of claim 6, wherein the information provision server is further configured to cause the CPU to execute steps including
receiving a selection-indicating input indicating that the using user has selected a selected commodity from among the one or more suggested commodities;

determining whether the using user wishes to defer purchasing the selected commodity; and storing in association with the using user, upon determining that the using user wishes to defer purchasing the selected commodity, an identifier of the selected commodity.

11. The information provision server of claim 10, wherein whether the using user wishes to defer purchasing the selected commodity is determined based on time-related responsive keywords.

12. The information provision server of claim 1, wherein the information provision server is further configured to cause the CPU to execute steps including receiving a selection-indicating input indicating that the using user has selected a selected commodity from among the one or more suggested commodities; and in response to receipt of the selection-indicating input, causing to be provided to the using user information obtained from the commodity database relating to the selected commodity.

* * * * *